(12) United States Patent
McCullough et al.

(10) Patent No.: US 8,895,856 B2
(45) Date of Patent: Nov. 25, 2014

(54) COMPRESSION CONNECTOR AND ASSEMBLY FOR COMPOSITE CABLES AND METHODS FOR MAKING AND USING SAME

(75) Inventors: Colin McCullough, St. Paul, MN (US); Herve E. Deve, St. Paul, MN (US); Michael F. Grether, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 176 days.

(21) Appl. No.: 13/577,920

(22) PCT Filed: Feb. 11, 2011

(86) PCT No.: PCT/US2011/024488
§ 371 (c)(1),
(2), (4) Date: Aug. 9, 2012

(87) PCT Pub. No.: WO2011/103036
PCT Pub. Date: Aug. 25, 2011

(65) Prior Publication Data
US 2012/0305312 A1 Dec. 6, 2012

Related U.S. Application Data

(60) Provisional application No. 61/305,935, filed on Feb. 18, 2010.

(51) Int. Cl.
| | | |
|---|---|---|
| *H01R 4/20* | (2006.01) | |
| *H01R 43/048* | (2006.01) | |
| *F16G 11/02* | (2006.01) | |
| *H02G 7/05* | (2006.01) | |
| *H01R 4/62* | (2006.01) | |
| *H01B 5/10* | (2006.01) | |

(52) U.S. Cl.
CPC ... *H01R 4/203* (2013.01); *H01R 4/62* (2013.01); *H01B 5/105* (2013.01); *F16G 11/02* (2013.01); *H02G 7/056* (2013.01)
USPC ............................................. 174/75 R; 29/862

(58) Field of Classification Search
CPC .......... H01R 4/62; H01R 4/203; H01B 5/105; F16G 11/02; H02G 7/056
USPC ............................................. 174/75 R; 29/862
See application file for complete search history.

(56) References Cited

U.S. PATENT DOCUMENTS

| | | |
|---|---|---|
| 1,793,293 A | 2/1931 | Varney et al. |
| 3,384,704 A | 5/1968 | Vockroth |

(Continued)

FOREIGN PATENT DOCUMENTS

| | | |
|---|---|---|
| GB | 750703 | 6/1956 |
| RU | 2335046 | 9/2008 |

(Continued)

*Primary Examiner* — Timothy Thompson
*Assistant Examiner* — Charles Pizzuto
(74) *Attorney, Agent, or Firm* — Adam Bramwell

(57) ABSTRACT

A compression connector and assembly include an elongated, interiorly hollow tube, and at least one tubular sleeve, the tube including a first material exhibiting a first axial extrusion rate and the sleeve including a second material exhibiting a second axial extrusion rate, wherein the sleeve wall thickness is selected such that, when inserted into the tube and subjected to mechanical compression in a direction substantially orthogonal to the tube's exterior surface, deforms so that the first and second materials extrude axially at substantially the same rate. In some exemplary embodiments, the sleeve wall thickness may be selected to be thin, or the sleeve may include a multiplicity of axially spaced-apart corrugations formed in at least one exterior or interior surface. The assembly may include stranded composite wires, optionally with a tape covering only a portion of the composite wires. A method of making the compression connector is also described.

20 Claims, 8 Drawing Sheets

(56) References Cited

U.S. PATENT DOCUMENTS

| | | |
|---|---|---|
| 3,429,722 A | 2/1969 | Economy et al. |
| 3,717,720 A | 2/1973 | Snellman |
| 3,795,524 A | 3/1974 | Sowman |
| 4,047,965 A | 9/1977 | Karst et al. |
| 4,345,112 A | 8/1982 | Sugata |
| 4,954,462 A | 9/1990 | Wood et al. |
| 5,112,882 A | 5/1992 | Babu et al. |
| 5,171,942 A | 12/1992 | Powers |
| 5,185,299 A | 2/1993 | Wood et al. |
| 5,362,921 A | 11/1994 | Birkelund et al. |
| 5,554,826 A | 9/1996 | Gentry |
| 5,647,046 A | 7/1997 | Cowen et al. |
| 5,780,154 A | 7/1998 | Okano et al. |
| 6,140,589 A | 10/2000 | Blackmore |
| 6,180,232 B1 | 1/2001 | McCullough et al. |
| 6,245,425 B1 | 6/2001 | McCullough et al. |
| 6,247,359 B1 | 6/2001 | De Angelis |
| 6,263,451 B1 | 7/2001 | Cheng |
| 6,329,056 B1 | 12/2001 | Deve et al. |
| 6,336,495 B1 | 1/2002 | McCullough et al. |
| 6,344,270 B1 | 2/2002 | McCullough et al. |
| 6,447,927 B1 | 9/2002 | McCullough et al. |
| 6,460,597 B1 | 10/2002 | McCullough et al. |
| 6,485,796 B1 | 11/2002 | Carpenter |
| 6,544,645 B1 | 4/2003 | McCullough et al. |
| 6,559,385 B1 | 5/2003 | Johnson et al. |
| 6,692,842 B2 | 2/2004 | McCullough et al. |
| 6,723,451 B1 | 4/2004 | McCullough et al. |
| 6,747,213 B2 | 6/2004 | Bonicel |
| 6,796,365 B1 | 9/2004 | McCullough et al. |
| 6,805,596 B2 | 10/2004 | Quesnel et al. |
| 7,093,416 B2 | 8/2006 | Johnson et al. |
| 7,131,308 B2 | 11/2006 | McCullough |
| 7,409,816 B2 | 8/2008 | Susai et al. |
| 2002/0027012 A1 | 3/2002 | Bonicel |
| 2003/0194916 A1 | 10/2003 | Quesnel et al. |
| 2004/0185290 A1 | 9/2004 | McCullough |
| 2005/0279074 A1 | 12/2005 | Johnson et al. |
| 2006/0102377 A1 | 5/2006 | Johnson et al. |
| 2006/0137880 A1 | 6/2006 | Figenschou et al. |
| 2006/0141252 A1 | 6/2006 | Chartier et al. |
| 2006/0193572 A1 | 8/2006 | Mjelstad |
| 2007/0044992 A1 | 3/2007 | Bremnes |
| 2007/0205009 A1 | 9/2007 | Figenschou |
| 2007/0237469 A1 | 10/2007 | Espen |
| 2007/0253778 A1 | 11/2007 | Figenschou et al. |
| 2007/0271897 A1 | 11/2007 | Hanna |
| 2008/0081721 A1 | 4/2008 | Bissig et al. |
| 2010/0038112 A1 | 2/2010 | Grether |
| 2012/0163758 A1 | 6/2012 | McCullough |
| 2012/0168199 A1 | 7/2012 | McCullough |

FOREIGN PATENT DOCUMENTS

| | | |
|---|---|---|
| RU | 2379803 | 1/2010 |
| SU | 1363351 | 12/1987 |
| WO | WO 97/00976 | 1/1997 |
| WO | WO 2011/008568 | 1/2011 |
| WO | WO 2011/008620 | 1/2011 |
| WO | WO 2011/094146 | 8/2011 |
| WO | WO 2011/103036 | 8/2011 |

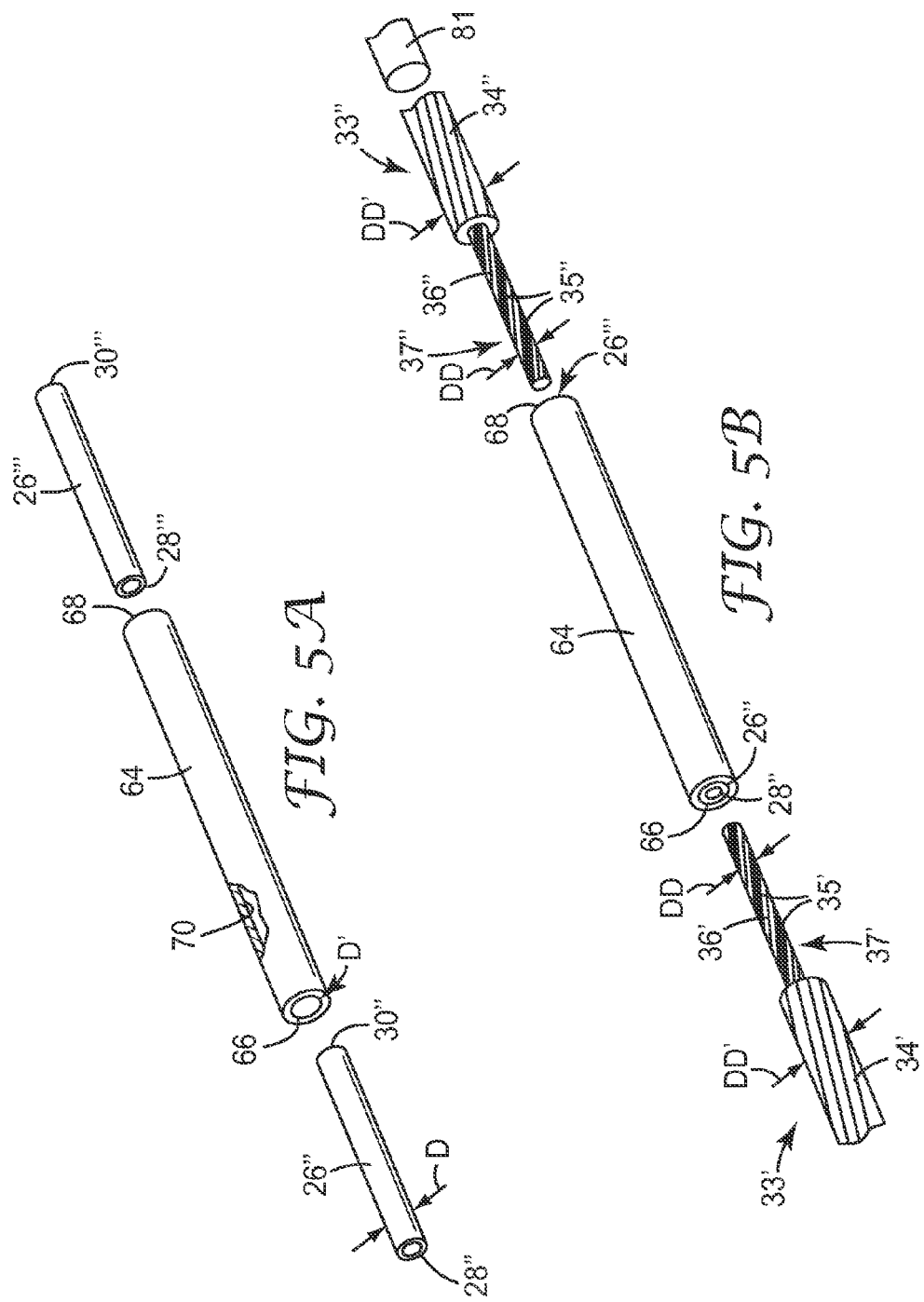

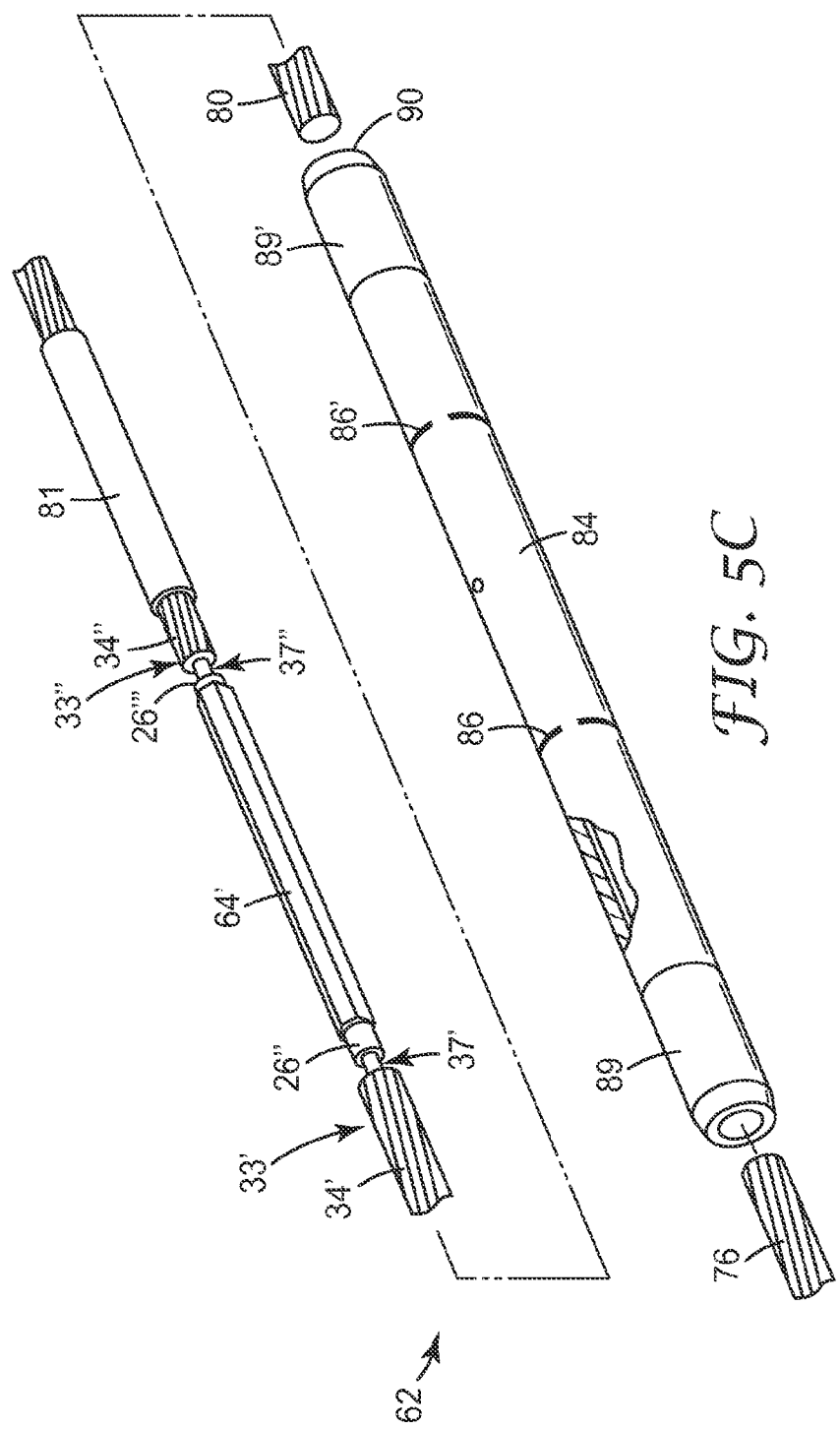

COMPRESSION CONNECTOR AND ASSEMBLY FOR COMPOSITE CABLES AND METHODS FOR MAKING AND USING SAME

CROSS REFERENCE TO RELATED APPLICATION

This application is a national stage filing under 35 U.S.C. 371 of PCT/US2011/024488, filed Feb. 11, 2011, which claims priority to Provisional Application No. 61/305,935, filed Feb. 18, 2010, the disclosure of which is incorporated by reference in its/their entirety herein.

TECHNICAL FIELD

The present disclosure relates generally to systems, assemblies and methods for making a connection to a composite cable. The present disclosure further relates to a compression connection for composite electrical power transmission cables, and methods for making and using the same.

BACKGROUND

There have been recently introduced useful cable articles from materials that are composite and thus cannot readily be plastically deformed to a new shape. Common examples of these materials include fiber reinforced composites which are attractive due to their improved mechanical properties relative to metals but are primarily elastic in their stress strain response. Composite cables containing fiber reinforced polymer wires are known in the art, as are composite cables containing ceramic fiber reinforced metal wires, see, e.g., U.S. Pat. Nos. 6,559,385 and 7,093,416; and Published PCT Application WO 97/00976. One use of composite cables (e.g., cables containing polymer matrix composite or metal matrix composite wires) is as a reinforcing member in bare (i.e. non-insulated) cables used for above-ground electrical power transmission.

In addition, in some applications, it may be desirable to use stranded composite cables for electrical power transmission. Cable stranding is a process in which individual ductile wires are combined, typically in a helical arrangement, to produce a finished cable. See, e.g., U.S. Pat. Nos. 5,171,942 and 5,554,826. Helically stranded power transmission cables are typically produced from ductile metals such as steel, aluminum, or copper. In some cases, such as bare overhead electrical power transmission cables, a helically stranded wire core is surrounded by a wire conductor layer. The helically stranded wire core could comprise ductile metal wires made from a first material such as steel, for example, and the outer power conducting layer could comprise ductile metal wires made from another material such as aluminum, for example. In some cases, the helically stranded wire core may be a pre-stranded composite cable used as an input material to the manufacture of a larger diameter electrical power transmission cable. Helically stranded composite cables generally may comprise as few as seven individual wires to more common constructions containing 50 or more wires.

In application, it is desirable to communicate the extending end of a given length of power cable, in both an insulated and effective current conducting fashion and such as to a succeeding and interconnecting length of cable. A cable to cable connection is typically made with a union or splice connection. Alternatively, another conventionally known connection for high current transfer power line is to an insulator string associated with an overhead tower or transmission support structure. Such a connection is conventionally known as a "dead-end" or connection or termination. Connector assemblies for conventional non-composite cables used in high current transfer (i.e. electrical power) transmission line applications are known generally in the art, for example, see U.S. Pat. Nos. 3,384,704 and 5,647,046.

Exemplary compression cable connectors are disclosed in U.S. Pat. No. 6,805,596. An exemplary dead-end compression connection assembly is illustrated in FIG. 1. An elongated and interiorly hollow metal tube 12 is provided, the tube having a first end 14 and a second end 16 and a desired polygonal (hexagonal, circular, etc.) cross sectional shape. The metal tube 12 has a selected interior diameter 18 and a plurality of spaced apart and accordion-like corrugations 20 extending along a selected axial length of the tube 12. A heavy duty eyelet 22 is integrally formed with and extending from the second end 16, and a felt washer 24 is slidably engaged over the metal tube 12 and inter-disposed between the spaced apart corrugations 20. An aluminum sleeve 26 is provided and includes a first end 28 and a second end 30. The sleeve 26 further exhibits a selected outer diameter no greater than the interior diameter 18 of the tube 12, such that the sleeve 26 is capable of being axially inserted through a selected end and into the tube 12.

SUMMARY

In one aspect, the present disclosure provides a compression connector and assembly including an elongated and interiorly hollow inner tube defining a center longitudinal axis, an interior surface defined by a first radial dimension, an exterior surface defined by a second radial dimension greater than the first radial dimension, and first and second opposed terminal ends, the tube comprising a first material exhibiting a first axial extrusion rate; at least one tubular sleeve comprising a second material exhibiting a second axial extrusion rate, the at least one tubular sleeve having a length, and an exterior surface defined by a third radial dimension less than the first radial dimension, an interior surface defining an interiorly hollow portion having a fourth radial dimension less than the third radial dimension, and first and second opposed terminal ends, wherein a difference between the third and fourth radial dimensions is selected to define a wall thickness such that the at least one sleeve, when axially inserted through the first or second terminal end of the hollow tube and subjected to mechanical compression in a direction substantially orthogonal to the exterior surface of the tube, deforms so that the first and second materials extrude axially at substantially the same rate.

In some exemplary embodiments of the compression connector and assembly, the wall thickness of the at least one sleeve is selected to be from about 0.5 mm to about 6 mm. In certain exemplary embodiments, the at least one sleeve includes a multiplicity of axially space-apart corrugations formed in at least one of the exterior surface or the interior surface. In further exemplary embodiments, the multiplicity of axially spaced apart corrugations is axially spaced apart by about 1 to about 5 mm. In certain exemplary embodiments, the multiplicity of axially spaced apart corrugations each have a width in the axial direction of from about 5 mm to about 50 mm. In additional exemplary embodiments, the plurality of axially spaced apart corrugations is from about 2 to about 30 corrugations. In some presently preferred exemplary embodiments, the first material and the second material comprise at least one metal, wherein the first material exhibits a yield stress of at least about 30 kpsi (at least about 206 MPa) and the second material exhibit a yield stress no greater than about 8 kpsi (no greater than about 56 MPa). In certain presently preferred exemplary embodiments, the first material comprises carbon steel, and the second material comprises aluminum.

In additional exemplary embodiments, the compression connectors and assemblies as described above may include an outer and interiorly hollowed tubular body having an interior surface defined by a fifth radial dimension greater than the second radial dimension, and an exterior surface defined by a sixth radial dimension greater than the fifth radial dimension, and first and second opposed terminal ends, the outer tubular body being slidably engaged over the inner tube, optionally wherein the outer tubular body comprises metal.

In further exemplary embodiments, the compression connector assemblies as described above may include a stranded composite cable having an external radius less than the fifth radial dimension of the outer tubular body, wherein the stranded composite cable comprises a composite core further comprising a single core wire defining a center longitudinal axis, at least a first plurality of composite wires stranded around the single core wire, and at least a second plurality of wires stranded around the first plurality of composite wires, further wherein a terminal portion of the single core wire and the at least first plurality of composite wires extend longitudinally beyond a terminal portion of the at least second plurality of wires, and additionally wherein at least a portion of the terminal portion of the at least first plurality of composite wires has a diameter less than twice the fourth radial dimension of the sleeve, and extends into the interiorly hollow portion of the sleeve.

In some exemplary embodiments, for example, those in which the wall thickness of the at least one sleeve is selected to be from about 0.5 mm to about 6 mm, the compression connector assemblies described above may include a tape wrapping peripherally around the first multiplicity of composite wires and covering only a portion of the first multiplicity of composite wires, wherein the at least second multiplicity of wires is stranded around the first plurality of composite wires and the tape.

In certain exemplary embodiments, the tape covers at most 70% of an outer peripheral surface of the first multiplicity of composite wires. In other exemplary embodiments, for example, those in which the at least one sleeve further includes a multiplicity of axially space-apart corrugations formed in at least one of the exterior surface or the interior surface, the tape may cover from about 30% to about 50% of the outer peripheral surface of the first multiplicity of composite wires. In further exemplary embodiments, the tape covers from about 1% to about 30% of the outer peripheral surface of the first multiplicity of composite wires.

In additional exemplary embodiments of the compression connector assemblies including a composite cable and composite core as described above, the single wire includes a metal conductor wire or a composite wire. In some exemplary embodiments, the single wire includes at least one optical fiber. In certain exemplary embodiments of compression connector assemblies as described above, at least a portion of the first multiplicity of composite wires is helically stranded around the single wire in at least one cylindrical layer formed about the center longitudinal axis when viewed in a cross section. In some exemplary embodiments, the multiplicity of composite wires is helically stranded around the single wire in at least two cylindrical layers formed about the center longitudinal axis when viewed in a radial cross section. In certain presently preferred exemplary embodiments, the cylindrical layer is stranded at a lay angle in a lay direction that is the same as a lay direction for each adjoining cylindrical layer. In additional presently preferred exemplary embodiments, a relative difference between lay angles for each adjoining cylindrical layer is greater than 0° and no greater than about 4°.

In further exemplary embodiments of compression connector assemblies as described above, the first multiplicity of composite wires have a cross-sectional shape selected from the group consisting of circular, elliptical, and trapezoidal. In certain exemplary embodiments, each of the first multiplicity of composite wires is a fiber reinforced composite wire. In some exemplary embodiments, at least one of the fiber reinforced composite wires is reinforced with one of a fiber tow or a monofilament fiber.

In additional exemplary embodiments of compression connector assemblies as described above, each of the first multiplicity of composite wires is selected from the group consisting of a metal matrix composite wire and a polymer composite wire. In such exemplary embodiments, the polymer composite wire may include at least one continuous fiber in a polymer matrix. In some exemplary embodiments, the at least one continuous fiber includes metal, carbon, ceramic, glass, or combinations thereof. In certain exemplary embodiments, the at least one continuous fiber includes titanium, tungsten, boron, shape memory alloy, carbon, carbon nanotubes, graphite, silicon carbide, aramid, poly(p-phenylene-2, 6-benzobisoxazole, or combinations thereof. In further exemplary embodiments, the polymer matrix includes a (co) polymer selected from the group consisting of an epoxy, an ester, a vinyl ester, a polyimide, a polyester, a cyanate ester, a phenolic resin, a bis-maleimide resin, polyetheretherketone, and combinations thereof.

In other exemplary embodiments of compression connector assemblies as described above, the metal matrix composite wire comprises at least one continuous fiber in a metal matrix. In some exemplary embodiments, the at least one continuous fiber includes a material selected from the group consisting of ceramics, glasses, carbon nanotubes, carbon, silicon carbide, boron, iron, steel, ferrous alloys, tungsten, titanium, shape memory alloy, and combinations thereof. In certain exemplary embodiments, the metal matrix includes aluminum, zinc, tin, magnesium, alloys thereof, or combinations thereof. In certain presently preferred exemplary embodiments, the metal matrix includes aluminum, and the at least one continuous fiber includes a ceramic fiber. In some presently preferred exemplary embodiments, the ceramic fiber comprises polycrystalline $\alpha$-$Al_2O_3$.

In further exemplary embodiments of compression connector assemblies as described above, an insulative sheath forms an outer surface of the composite cable. In some exemplary embodiments, the insulative sheath includes a material selected from the group consisting of a ceramic, a glass, a (co)polymer, and combinations thereof.

In other exemplary embodiments of compression connector assemblies as described above, the composite cable connector is a dead end cable connector or a cable splice connector. In certain exemplary embodiments, the composite connector assembly is a dead end connector, and the outer tubular body includes a terminal application tongue extending from a selected end of the outer tubular body. In some exemplary embodiments, an eyelet may extend from a selected end of the tube and beyond the outer tubular body. In further exemplary embodiments, the eyelet includes a steel eye forging having a selected shape and dimension adapted to engage an insulator string associated with an electrical power transmission line.

In further exemplary embodiments, the compression connector is a cable splice connector, and the at least one sleeve consists essentially of two sleeves. In some exemplary embodiments, the outer tubular body includes a joint connector body. In certain such exemplary embodiments, the outer tubular body includes at least one metal.

In another aspect, the present disclosure provides a method of constructing a compression connector as described above, including: axially inserting the sleeve into the interiorly hollow portion of the tube, inserting the terminal portion of the single core wire and the at least first plurality of composite wires into the interiorly hollow portion of the sleeve, after inserting the terminal portion of the single core wire and the at least first plurality of composite wires into the interiorly hollow portion of the sleeve and axially inserting the sleeve into the interiorly hollow portion of the tube, mechanically compressing the tube in a direction substantially orthogonal to the exterior surface of the tube, thereby deforming the tube and the sleeve such that the first and second materials extrude axially at substantially the same rate, and optionally, thereafter slidably engaging the outer tubular body over the tube to at least partially cover the tube.

In certain exemplary embodiments, mechanically compressing the tube in a direction substantially orthogonal to the exterior surface of the tube includes mechanically compressing the elongated tube in a forging die. In some exemplary embodiments, the forging die mechanically compresses only a portion of the inner tube. In certain presently preferred embodiments, the forging die mechanically compresses substantially the entire length of the sleeve. In further presently preferred exemplary embodiments, the forging die has a length, and the terminal portion of the single core wire and the at least first plurality of composite wires form a cylindrical composite core having a diameter, wherein the ratio of the forging die length to the composite core diameter is no greater than about 6.

Certain embodiments of the present disclosure are directed at providing an electrical power transmission cable with a compression connection assembly including at least a composite wire core cable connected to a compression connector. Terminations or "dead-end" compression connector assemblies are typically used to connect composite cable conductors to transmission towers and the electrical power grid.

One exemplary type of termination involves the use of a compression-style dead end connector. Under some circumstances, different size composite conductors may behave differently with different compression-style dead end connectors. Variability in behavior may even occur with the same composite conductor size used with the same dead end connection. The differences in behavior may manifest themselves as breakage of composite core wires during compression or forging to form the compression connection assembly, or slippage of the composite wire core out of the composite compression connector assembly of the compression connector at low loads.

Surprisingly, in some exemplary embodiments, we have found that these problems may be overcome. Thus, in some exemplary embodiments of the present disclosure, a compression connector and assembly decreases or eliminates the risk of composite wire breakage or slippage of the composite core wires out of the connector assembly under load, thereby improving the reliability of the compression connector assembly. In certain exemplary embodiments, the compression connector assembly can readily withstand the required mechanical tension in service, thereby increasing the overall service reliability of the compression connection assembly and reducing the expense and difficulty of troubleshooting broken wires or failed compression connections.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain presently preferred exemplary embodiments using the principles disclosed herein.

BRIEF DESCRIPTION OF DRAWINGS

Exemplary embodiments of the present disclosure are further described with reference to the appended FIGS., wherein:

FIGS. 5A-5C are succeeding partially exploded perspective views of an exemplary compression joint connector assembly for use with two stranded composite cables to form a cable splice according to an exemplary embodiment of the present disclosure.

Like reference numerals in the drawings indicate like elements. The drawings herein as not to scale, and in the drawings, the components of the composite cables are sized to emphasize selected features.

DETAILED DESCRIPTION

Figure 1:
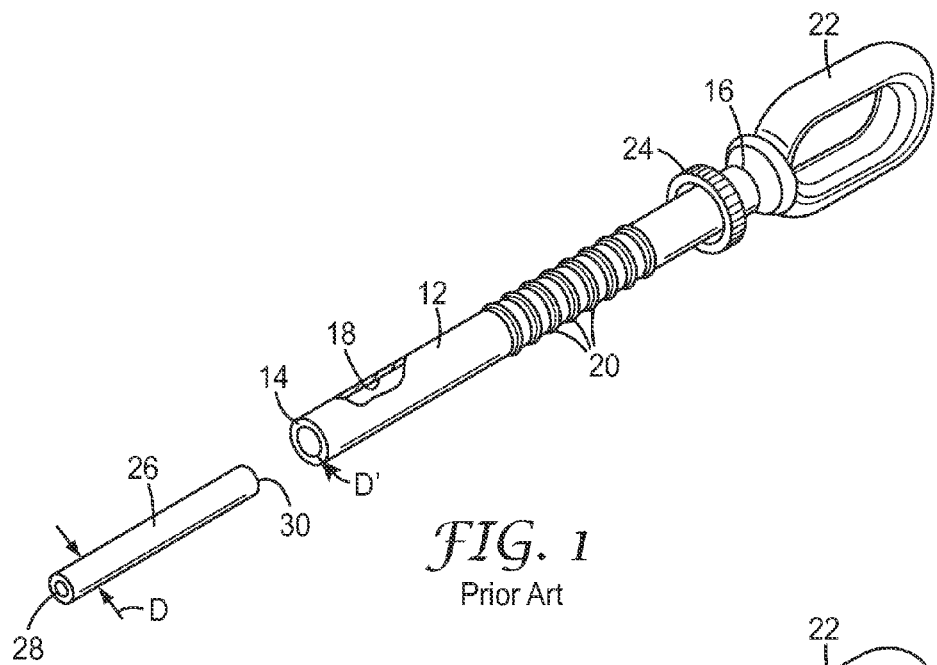
FIG. 1 is a perspective view in partially exploded fashion of a prior art compression dead end connector.

Certain terms are used throughout the description and the claims that, while for the most part are well known, may require some explanation. It should understood that, as used herein, when referring to a "wire" as being "brittle," this means that the wire will fracture under tensile loading with minimal plastic deformation.

The term "ductile" when used to refer to the deformation of a wire, means that the wire would substantially undergo plastic deformation during tensile loading or bending without fracture or breakage.

The term "composite wire" refers to a wire formed from a combination of materials differing in composition or form which are bound together, and which exhibit brittle or non-ductile behavior.

The term "metal matrix composite wire" refers to a composite wire comprising one or more reinforcing materials bound into a matrix consisting of one or more ductile metal phases.

The term "polymer matrix composite wire" similarly refers to a composite wire comprising one or more reinforcing materials bound into a matrix consisting of one or more polymeric phases.

The term "bend" or "bending" when used to refer to the deformation of a wire includes two dimensional and/or three dimensional bend deformation, such as bending the wire helically during stranding. When referring to a wire as having bend deformation, this does not exclude the possibility that the wire also has deformation resulting from tensile and/or torsional forces.

"Significant elastic bend" deformation means bend deformation which occurs when the wire is bent to a radius of curvature up to 10,000 times the radius of the wire. As applied to a circular cross section wire, this significant elastic bend deformation would impart a strain at the outer fiber of the wire of at least 0.01%.

The terms "cabling" and "stranding" are used interchangeably, as are "cabled" and "stranded."

The term "lay" describes the manner in which the wires in a stranded layer of a helically stranded composite cable are wound into a helix.

The term "lay direction" refers to the stranding direction of the wire wires in a helically stranded layer. To determine the lay direction of a helically stranded layer, a viewer looks at the surface of the helically stranded wire layer as the cable points away from the viewer. If the wire wires appear to turn in a clockwise direction as the wires progress away from the viewer, then the cable is referred to as having a "right hand lay." If the wire wires appear to turn in a counter-clockwise direction as the wires progress away from the viewer, then the cable is referred to as having a "left hand lay."

The terms "center axis" and "center longitudinal axis" are used interchangeably to denote a common longitudinal axis positioned radially at the center of a multilayer helically stranded composite cable.

The term "lay angle" refers to the angle, formed by a stranded wire, relative to the center longitudinal axis of a helically stranded composite cable.

The term "crossing angle" means the relative (absolute) difference between the lay angles of adjacent wire layers of a helically stranded wire cable.

The term "lay length" refers to the length of the stranded composite cable in which a single wire in a helically stranded layer completes one full helical revolution about the center longitudinal axis of a helically stranded composite cable.

The term "ceramic" means glass, crystalline ceramic, glass-ceramic, and combinations thereof.

The term "polycrystalline" means a material having predominantly a plurality of crystalline grains in which the grain size is less than the diameter of the fiber in which the grains are present.

The term "continuous fiber" means a fiber having a length that is relatively infinite when compared to the average fiber diameter. Typically, this means that the fiber has an aspect ratio (i.e., ratio of the length of the fiber to the average diameter of the fiber) of at least $1\times10^5$ (in some embodiments, at least $1\times10^6$, or even at least $1\times10^7$). Typically, such fibers have a length on the order of at least about 15 cm to at least several meters, and may even have lengths on the order of kilometers or more.

The term "extrudes axially at substantially the same rate" means that the at least one sleeve, when axially inserted through the first or second terminal end of the hollow inner tube of a compression connector, and subjected to mechanical compression in a direction substantially orthogonal to the exterior surface of the inner tube, deforms so that the first material (making up the inner tube) and the second material (making up the sleeve) deform in the axial direction by substantially the same amount. Thus, if the sleeve and the inner tube are substantially the same length before mechanical compression, then after mechanical compression in a direction substantially orthogonal to the exterior surface of the inner tube, the sleeve will extend outwardly beyond one or both terminal ends of the inner tube by no more than about 2 mm.

Compression dead end terminations and splices (i.e. joint terminations) are commonly used for connecting metal electrical power transmission conductor cables to the electrical power grid. The metal conductor cables typically contain a core of stranded steel wires, surrounded by layers of stranded aluminum metal wire. In terminations, a section at the end of a conductor has the aluminum wires removed to expose the steel core. A composite compression connector assembly made of steel is then attached by compressing a steel tube (attached to a pulling eye) around the core wires. The compressing is achieved by use of a hydraulically-driven press fitted with correctly-sized dies that provide the proper amount of radial compression. This ensures that the steel contributes to the strength of the termination. The steel forging body connecting the core is the same for both dead end terminations and splices. In establishing either of the above types of connections, it is further desirable to compress an encircling tube or barrel, typically constructed of steel, and associated with the connector assembly.

For composite conductors, the composite core wire material is typically an aluminum matrix composite. Forging a steel tube directly onto the composite core wires is not generally preferred, because the forces required to deform the steel are too high and they break the composite core. A composite core of the current transfer line is inserted into one end of the steel barrel, the barrel being subsequently subjected to an area reduction/compression forging process operating at pressures of 10,000 psi (about 69 MPa) or more, and upon inserting the barrel between a pair of heavy duty compression dies. The objective of this operation is to fixedly secure the current conductive composite core wires within the steel jacket and in the desired current carrying manner with respect to the succeeding cable or dead-end connector.

A specific problem uncovered in the compression of the steel barrel is the tendency of the core to damage or fracture as a result of it subsequent tensioning after installation and in use. It has also been determined to be desirable to establish a tensioning grip to the core in use up to 95% of its rated strength. The core must further be maintained in a substantially linear extending fashion during the initial mechanical die compression, else the subsequently applied tension will focus only on a portion of its wires, resulting in damage by crushing, notching or bending of the core.

It has also been determined that, as the composite core exhibits fairly low ductility elongation properties, it is required that the outer wires of the composite cable be loaded prior to those of the core, or else premature failure of the core may occur. An additional requirement of the compression connector is that it must be designed to retain the outer wires (which may be ductile metal conductor wires) of the composite cable without damage in order to achieve a 95% desired rated strength of the composite cable.

Furthermore, under some circumstances, different size composite conductors may behave differently with different compression-style dead end connectors. Variability in behavior may even occur with the same composite conductor size used with the same dead end connection. The differences in behavior may manifest themselves as breakage of composite core wires during compression or forging to form the compression connection assembly, or slippage of the composite wire core out of the composite compression connector assembly of the compression connector at low loads.

Surprisingly, in some exemplary embodiments, we have found that these problems may be overcome by one or more of the following modifications:

(i) selecting a sleeve material and a tube material such that the sleeve, when axially inserted into the hollow outer tube and subjected to mechanical compression in a direction substantially orthogonal to the exterior surface of the tube, deforms so that the sleeve and tube materials extrude axially at substantially the same rate;

(ii) selecting a sleeve wall thickness that is so thin (e.g. from about 0.5 mm to about 6 mm) that the sleeve, when axially inserted into the hollow outer tube and subjected to mechanical compression in a direction substantially orthogonal to the exterior surface of the tube, deforms so that the sleeve and tube materials extrude axially at substantially the same rate;

(iii) providing the sleeve with a multiplicity of axially spaced-apart radial corrugations formed in at least one of the exterior surface or the interior surface of the sleeve such that the sleeve, when axially inserted into the hollow outer tube and subjected to mechanical compression in a direction substantially orthogonal to the exterior surface of the tube, deforms so that the sleeve and tube materials extrude axially at substantially the same rate;

(iv) selecting a metal inner tube material from a first material that exhibits a yield stress of at least about 30 kpsi (at least about 206 MPa), and selecting a metal sleeve material from a second material that exhibit a yield stress of no greater than about 8 kpsi (no greater than about 56 MPA), such that the sleeve, when axially inserted into the hollow outer tube and subjected to mechanical compression in a direction substantially orthogonal to the exterior surface of the tube, deforms so that the sleeve and tube materials extrude axially at substantially the same rate; and (v) selecting a compression die such that the ratio of die length to core diameter of the composite cables is no greater than about 6, such that the sleeve, when axially inserted into the hollow outer tube and subjected to mechanical compression in a direction substantially orthogonal to the exterior surface of the tube, deforms so that the sleeve and tube materials extrude axially at substantially the same rate.

Thus, in some exemplary embodiments, the compression connector assembly can withstand the required mechanical tension in service, thereby increasing the overall service reliability of the composite power transmission cable, and reducing the expense and difficulty of troubleshooting broken wires or failed compression connections.

Furthermore, composite wires are generally brittle and non-ductile, and thus may not be sufficiently deformed during conventional cable stranding processes in such a way as to maintain their helical arrangement without breaking the wires. Therefore, the present disclosure provides, in certain embodiments, a higher tensile strength stranded composite cable, and further, provides, in some embodiments, an adhesive tape means for maintaining the helical arrangement of the wires in the stranded composite cable core.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Thus, in one aspect, the present disclosure provides a compression connector and assembly including an elongated and interiorly hollow inner tube defining a center longitudinal axis, an interior surface defined by a first radial dimension, an exterior surface defined by a second radial dimension greater than the first radial dimension, and first and second opposed terminal ends, the tube comprising a first material exhibiting a first axial extrusion rate; at least one tubular sleeve comprising a second material exhibiting a second axial extrusion rate, the at least one tubular sleeve having a length, and an exterior surface defined by a third radial dimension less than the first radial dimension, an interior surface defining an interiorly hollow portion having a fourth radial dimension less than the third radial dimension, and first and second opposed terminal ends, wherein a difference between the third and fourth radial dimensions is selected to define a wall thickness such that the at least one sleeve, when axially inserted through the first or second terminal end of the hollow tube and subjected to mechanical compression in a direction substantially orthogonal to the exterior surface of the tube, deforms so that the first and second materials extrude axially at substantially the same rate.

Figure 2:
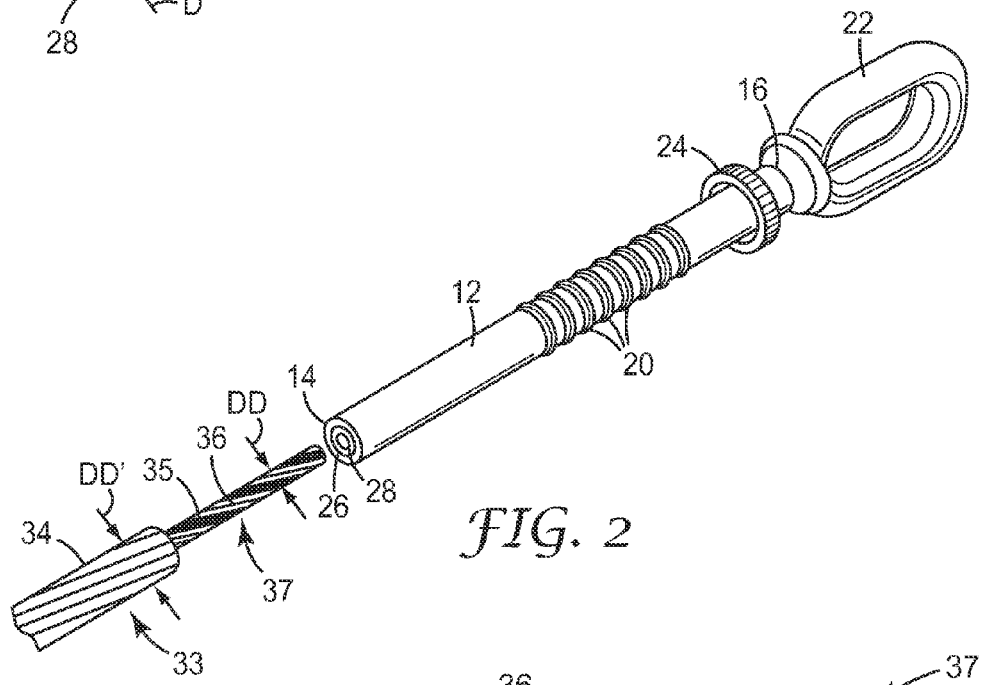
FIG. 2 is a perspective view in partially exploded fashion of an exemplary compression dead end connector assembly for use with a stranded composite cable according to an exemplary embodiment of the present disclosure.

Referring now to FIG. 2, an exemplary compression dead end connector assembly according to a first exemplary embodiment of the present disclosure is illustrated. An elongated and interiorly hollow inner tube 12 is provided, the inner tube having a first end 14 and a second end 16 and a desired polygonal (circular as shown, hexagonal, rectangular, etc.) cross sectional shape. The inner tube 12 in a presently preferred embodiment is constructed of a suitable carbon steel material; however in other exemplary embodiments, the tube 12 may be constructed of any metallic and conductive material having specified ductility, yield stress and axial extrusion rate.

A sleeve 26 is provided and includes a first end 28 and a second end 30 (see FIG. 1). The sleeve 26 further exhibits a selected radial dimension (e.g. outer diameter D) no greater than a selected radial dimension (e.g. interior diameter D' of the inner tube 12), such that the sleeve 26 is capable of being axially inserted through a selected end and into the tube with little or no effort. The sleeve 26 is, in an exemplary presently preferred embodiment, constructed of a suitable aluminum material; however in other exemplary embodiments, the tube 12 may be constructed of any metallic and conductive material having specified ductility, yield stress and axial extrusion rate. As illustrated in FIG. 2, the sleeve 26 is shown inserted into the associated end 14 of the inner tube 12.

The tube 12 according to this first exemplary embodiment, shown in FIG. 2, is configured for particular application to a dead-end connector assembly (see 10 in FIG. 4) useful for connecting a composite cable core to an overhead tower or pole. The tube 12 includes such particular features as a selected interior diameter 26 (see cutaway portion in FIG. 2) and optionally, a plurality of spaced apart and accordion-like corrugations 20 extending along a selected axial length of the tube 12. Yet additional optional features include a heavy duty eyelet 22, such as a steel eye forging, integrally formed with and extending from the tube second end 16, as well as a felt washer 24 slidably engaged over the tube and inter-disposed between the spaced apart corrugations 20.

Referring again to FIG. 2, a composite conductor cable 33 is provided and includes a plurality of, typically helically wound, outer wires 34 (which may, for example, be ductile metal wires) defining an exterior surface having a radial dimension (diameter DD'), and a central extending plurality of inner stranded composite wires 36 (also referred to as an inner composite core 37) defining an exterior surface having a radial dimension (diameter DD). The diameter DD of the composite core 37 is selected to be less than the inner diameter D' of the sleeve 26 (see e.g. FIG. 3C-3D). A tape 35 may, in some exemplary embodiments, be wrapped such that each successive wrap abuts the previous wrap without a gap and without overlap (not shown in the drawings). Alternatively, in some exemplary embodiments, successive tape 35 wraps may be spaced so as to leave a gap between each wrap, as shown in FIG. 2.

In one exemplary embodiment, the composite conductor typically includes high temperature aluminum alloy wires in the stranded plurality of wires 34, whereas the inner and extending composite wires 36 or composite core 37 is constructed of aluminum matrix composite wires. It is again understood that the material construction and composition of the outer 34 wires and inner 36 composite wires of the cable can very according to the application desired.

As again illustrated in FIG. 2, the extending central plurality of wires 36 (also again known as the composite core 37) is inserted within the end 28 of the aluminum sleeve 26, such as which is proximate the coaxially and outer disposed end 14 of the outer steel tube 12. At this point, a mechanical compression operation is performed on the outer steel tube 12, interiorly held aluminum sleeve 26, and centrally inserted extending plurality of composite wires 36. Although not shown, it is understood that a suitable compressor may include first and second opposing and mating dies (not shown) for receiving therebetween the outer steel tube 12. The mechanical compressor may be rated to any suitable pressure application, such capable of exceeding 10,000 pounds per square inch (psi) (about 69 MPa) and it is also understood that the mechanical compression forming operation also provides the effect of reducing the overall area of the steel tube 12.

Figure 3A:
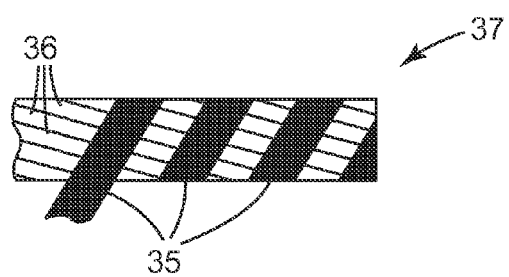
FIG. 3A is a side view of an exemplary stranded composite cable including a first plurality of composite wires and a maintaining means in the form of a tape wrapped around and covering only a portion of the first plurality of composite wires, useful in preparing exemplary compression connector assemblies according to exemplary embodiments of the present disclosure.

It will be recognized that the composite wires have a significant amount of elastic bend deformation when they are stranded on conventional cabling equipment. This significant elastic bend deformation would cause the wires to return to their un-stranded or unbent shape if there were not a maintaining means for maintaining the helical arrangement of the wires. Therefore, in some embodiments, a maintaining means is selected so as to maintain significant elastic bend deformation of the plurality of stranded composite wires In some exemplary embodiments illustrated by FIG. 2, the stranded composite cable core comprises a plurality of stranded composite wires with a tape wrapped helically around the entire composite cable core assembly as illustrated by FIG. 3A. This is a manufacturing aid to permit transit between core stranding and aluminum stranding operations. Without this, the core would not retain its helically stranded configuration. The amount of tape used can vary. This is characterized as % tape coverage, or the area of core in a given length that is covered by tape in proportion to the total area of exposed core. This parameter has been found to be important in the correct forging of the cores.

In certain exemplary embodiments illustrated by FIG. 3A, a maintaining means, for example a tape 35, may be wrapped such that each successive wrap abuts the previous wrap without a gap and without overlap. Alternatively, in some presently preferred exemplary embodiments, successive wraps may be spaced so as to leave a gap between each wrap. In one presently preferred embodiment, the tape 35 is wrapped such that a gap is left between one or more wraps. In one particularly preferred embodiment, the tape is wrapped so as to cover no more than about 60%, more preferably no more than 50%, and even more preferably no more than 40% of the surface of the stranded composite wires. In additional presently preferred embodiment, the tape is wrapped so as to cover at least about 10%, more preferably at least about 20%, and even more preferably no more than about 30% of the surface of the stranded composite wires.

FIG. 3A illustrates a maintaining means that is a tape 35, which may comprise a backing with an adhesive (not shown). In this exemplary embodiment, suitable adhesives include, for example, (meth)acrylate (co)polymer based adhesives, poly($\alpha$-olefin) adhesives, block copolymer based adhesives, natural rubber based adhesives, silicone based adhesives, and hot melt adhesives. Pressure sensitive adhesives may be preferred in certain embodiments. In some exemplary embodiments, the tape 35 may act as an insulative sheath surrounding the composite cable.

In further exemplary embodiments, suitable materials for tape 35 backing include metal foils, particularly aluminum; polyester; polyimide; and glass reinforced backings; provided the tape 35 is strong enough to maintain the elastic bend deformation and is capable of retaining its wrapped configuration by itself, or is sufficiently restrained if necessary. One particularly preferred backing 20 is aluminum. Such a backing preferably has a thickness of between 0.002 and 0.005 inches (0.05 to 0.13 mm), and a width selected based on the diameter of the stranded composite cable 10. For example, for a stranded composite cable 10 having two layers of stranded composite wires such as such as illustrated in FIG. 3A, and having a diameter of about 0.5 inches (1.3 cm), an aluminum tape having a width of 1.0 inch (2.5 cm) is preferred.

Some presently preferred commercially available tapes include the following Metal Foil Tapes (available from 3M Company, St. Paul, Minn.): Tape 438, a 0.005 inch thick (0.13 mm) aluminum backing with acrylic adhesive and a total tape thickness of 0.0026" inches (0.18 mm); Tape 431, a 0.0019 inch thick (0.05 mm) aluminum backing with acrylic adhesive and a total tape thickness of 0.0031 inches (0.08 mm); and Tape 433, a 0.002 inch thick (0.05 mm) aluminum backing with silicone adhesive and a total tape thickness of 0.0036 inches (0.09 mm). A suitable metal foil/glass cloth tape is Tape 363 (available from 3M Company, St. Paul, Minn.), as described in the Examples. A suitable polyester backed tape includes Polyester Tape 8402 (available from 3M Company, St. Paul, Minn.), with a 0.001 inch thick (0.03 mm) polyester backing, a silicone based adhesive, and a total tape thickness of 0.0018 inches (0.03 mm).

When using tape 35 as the maintaining means, either with or without adhesive, the tape may be applied to the stranded composite cable with conventional tape wrapping apparatus as is known in the art. Suitable taping machines include those available from Watson Machine, International, Patterson, N.J., such as model number CT-300 Concentric Taping Head. The tape overwrap station is generally located at the exit of the cable stranding apparatus and is applied to the helically stranded composite wires prior to the cable 10 being wound onto a take up spool. The tape 35 is selected so as to maintain the stranded arrangement of the elastically deformed composite wires.

Furthermore, the intended application for the stranded composite cable may suggest certain maintaining means are better suited for the application. For example, when the stranded composite cable is used as a submersible or underground electrical power transmission cable, the tape should be selected so as to not adversely affect the electrical power transmission at the temperatures, depths, and other conditions experienced in this application. When an adhesive tape 35 is used as the maintaining means, both the adhesive and the backing should be selected to be suitable for the intended application.

Figure 3B:
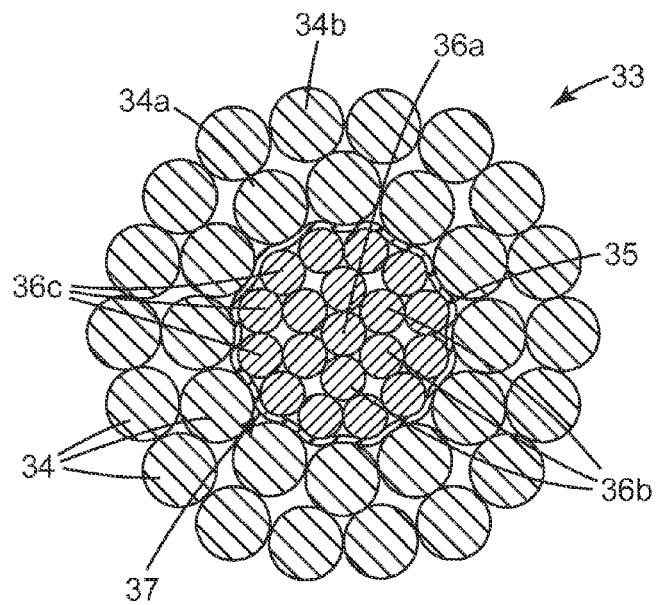
FIG. 3B is a cross-sectional end view of an exemplary stranded composite cable including a first plurality of composite wires and a maintaining means in the form of a tape wrapped around and covering only a portion of the first plurality of composite wires, and at least a second plurality of wires stranded around the first plurality of composite wires and the tape, useful in preparing exemplary compression connector assemblies according to exemplary embodiments of the present disclosure.

Turning now to FIG. 3B, an end view of an exemplary stranded composite cable 33 of FIG. 3A is shown. In exemplary embodiments, the compression connector assembly includes a composite cable 33 which includes a composite core 37 comprising a single wire 36a (which may be a composite wire as shown in FIG. 3B, or may be a ductile metal wire 34, or a fiber optic "wire" bundle) defining a common longitudinal axis, a plurality of composite wires 36b-36c around the wire core, and optionally, an tape 35 wrapped around the plurality of composite wires 36a-36b. In some exemplary embodiments, at least a portion of the plurality of composite wires 36a-36b is arranged around the single wire core 36a defining the common longitudinal axis in at least one cylindrical layer formed about the common longitudinal axis when viewed in a radial cross section. In other exemplary embodiments, the single wire core comprises at least one of a metal conductor wire 34 or a composite wire 36. In additional exemplary embodiments, at least one of the at least two cylindrical layers comprises only the composite wires 36. In certain additional exemplary embodiments, at least one of the at least two cylindrical layers further comprises at least one ductile metal wire 34.

As noted above, in exemplary embodiments, the composite cores 37-37' may comprise a plurality of composite wires 36-36'. In further exemplary embodiments, at least a portion of the plurality of composite wires is stranded around the single wire (which may be a ductile metal wire, a composite wire, or an optical fiber bundle) defining the common longitudinal axis. Suitable stranding methods, configurations and materials are disclosed in U.S. Pat. App. Pub. No. 2010-0038112.

In further exemplary embodiments (not shown), the stranded composite cable may further comprise additional (e.g. subsequent) layers (e.g. a fourth, fifth, or other subsequent layer) of composite wires stranded around the third plurality of composite wires 8 in the first lay direction at a lay angle defined relative to the common longitudinal axis, wherein the composite wires in each layer have a characteristic lay length, the relative difference between the third lay angle and the fourth or subsequent lay angle being no greater than about 4°. Embodiments in which four or more layers of stranded composite wires are employed preferably make use of composite wires having a diameter of 0.5 mm or less.

In some exemplary embodiments, the relative (absolute) difference between the first lay angle and the second lay angle is greater than 0° and no greater than about 4°. In certain exemplary embodiments, the relative (absolute) difference between one or more of the first lay angle and the second lay angle, the second lay angle and the third lay angle, is no greater than 4°, no greater than 3°, no greater than 2°, no greater than 1°, or no greater than 0.5°. In certain exemplary embodiments, one or more of the first lay angle equals the second lay angle, the second lay angle equals the third lay angle, and/or each succeeding lay angle equals the immediately preceding lay angle.

In further embodiments, one or more of the first lay length is less than or equal to the second lay length, the second lay length is less than or equal to the third lay length, the fourth lay length is less than or equal to an immediately subsequent lay length, and/or each succeeding lay length is less than or equal to the immediately preceding lay length. In other embodiments, one or more of the first lay length equals the second lay length, the second lay length equals the third lay length, and/or each succeeding lay length equals the immediately preceding lay length. In some embodiments, it may be preferred to use a parallel lay, as is known in the art.

In additional exemplary embodiments, the composite cables may further comprise at least one, and in some embodiments a plurality, of non-composite wires. In some particular exemplary embodiments, the stranded composite cable, whether entirely composite, partially composite or entirely non-composite, may be helically stranded. In other additional exemplary embodiments, each cylindrical layer is stranded at a lay angle in a lay direction that is the same as a lay direction for each adjoining cylindrical layer. In certain presently preferred exemplary embodiments, a relative difference between lay angles for each adjoining cylindrical layer is no greater than about 4°. In other exemplary embodiments, the composite wires and/or non-composite wires have a cross-sectional shape selected from circular, elliptical, and trapezoidal.

In certain additional exemplary embodiments, the composite cables may further comprise a plurality of ductile metal wires 34, and optionally, an insulative sheath surrounding the plurality of composite and ductile wires (not shown). In some presently preferred exemplary embodiments, the ductile metal conductor wires are stranded, more preferably helically stranded, around the exemplary composite cable core. In certain exemplary embodiments, the first plurality of ductile wires 34a is stranded in a lay direction opposite to that of an adjoining radial layer, for example, the outer layer of the composite core 37 comprising the second plurality of composite wires 34c, and/or the second plurality of ductile wires 34b.

In other exemplary embodiments, the first plurality of ductile wires 34a is stranded in a lay direction the same as that of an adjoining radial layer, for example, the outer layer comprising the second plurality of composite wires 36c, and/or the second plurality of ductile wires 34b. In further exemplary embodiments, at least one of the first plurality of ductile wires 34a, the second plurality of ductile wires 34b, or an optional third, fourth or larger plurality of ductile wires (not shown), is stranded in a lay direction opposite to that of an adjoining radial layer, for example, the second layer of ductile wires 34b may be stranded in a lay direction opposite to that of the first plurality of ductile wires 34a.

In further exemplary embodiments, each ductile wire has a cross-sectional shape, in a direction substantially normal to the center longitudinal axis, selected from circular, elliptical, or trapezoidal. In further exemplary embodiments, some or all of the ductile wires (34a-34b) may have a cross-sectional shape, in a direction substantially normal to the center longitudinal axis, that is "Z" or "S" shaped (not shown). Wires of such shapes are known in the art, and may be desirable, for example, to form an interlocking outer layer of the cable.

In additional embodiments, the ductile wires comprise at least one metal selected from the group consisting of copper, aluminum, iron, zinc, cobalt, nickel, chromium, titanium, tungsten, vanadium, zirconium, manganese, silicon, alloys thereof, and combinations thereof.

Although FIG. 3B shows a single center composite core wire 36a defining a center longitudinal axis, it is additionally understood that single center composite core wire 36a may alternatively be a ductile metal wire. It is further understood that each layer of composite wires exhibits a lay length, and that the lay length of each layer of composite wires may be different, or preferably, the same lay length.

Furthermore, it is understood that in some exemplary embodiments, each of the composite wires 36a-36c has a cross-sectional shape, in a direction substantially normal to the center longitudinal axis, generally circular, elliptical, or trapezoidal. In certain exemplary embodiments, each of the composite wires has a cross-sectional shape that is generally circular, and the diameter of each composite wire is at least about 0.1 mm, more preferably at least 0.5 mm; yet more preferably at least 1 mm, still more preferably at least 2 mm, most preferably at least 3 mm; and at most about 15 mm, more preferably at most 10 mm, still more preferably at most 5 mm, even more preferably at most 4 mm, most preferably at most 3 mm. In other exemplary embodiments, the diameter of each composite wire may be less than 1 mm, or greater than 5 mm.

Typically the average diameter of the single center wire 36a, having a generally circular cross-sectional shape, is in a range from about 0.1 mm to about 15 mm. In some embodiments, the average diameter of the single center wire is desirably is at least about 0.1 mm, at least 0.5 mm, at least 1 mm, at least 2 mm, at least 3 mm, at least 4 mm, or even up to about 5 mm. In other embodiments, the average diameter of the single central wire is less than about 0.5 mm, less than 1 mm, less than 3 mm, less than 5 mm, less than 10 mm, or less than 15 mm.

Turning again to FIG. 2, in some exemplary embodiments of a compression connector and assembly, a conventional tubular sleeve may be used; however the wall thickness of the at least one sleeve 26 is selected to be thin, that is, from about 0.5 mm to about 6 mm. Preferably, a sleeve with a thin wall thickness, preferably no more than about 4 mm, more preferably no more than about 3 mm, still more preferably no more than about 2.5 mm, and most preferably less than about 2 mm, is selected. This may provide for stress relief during the forging process to form a compression connection.

Having given above a general description of the inner tube 12, inserted sleeve 26 and inwardly extending central composite core 37 (plurality of composite wires 36) of the composite cable 33, an explanation will now be given as to the properties of the sleeve 26 during the mechanical compression of the inner tube 12. Accordingly, and upon the compressing and area reducing force being applied to the inner tube 12 by the dies of the forging apparatus (not shown), the sleeve 26 extrudes at substantially the same axial extrusion rate as the inner tube 12, such that the material associated with the sleeve 26 substantially fills any irregularities and voids existing between the centrally extending inner wires 36.

Figure 3C:
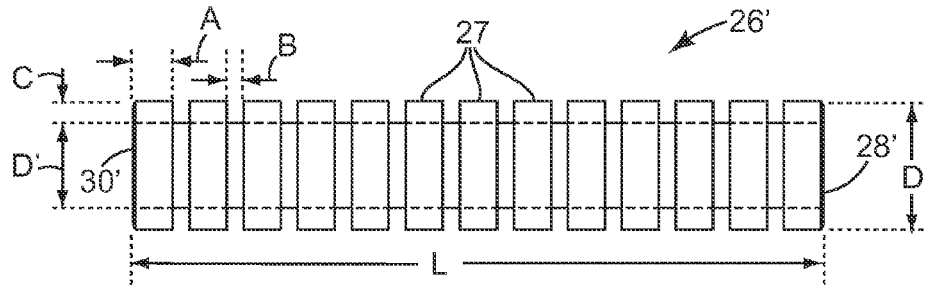
FIG. 3C is a side view of an exemplary corrugated sleeve comprising an outer portion including a plurality of axially spaced-apart corrugations useful in preparing exemplary compression connector assemblies according to exemplary embodiments of the present disclosure.
Figure 3D:
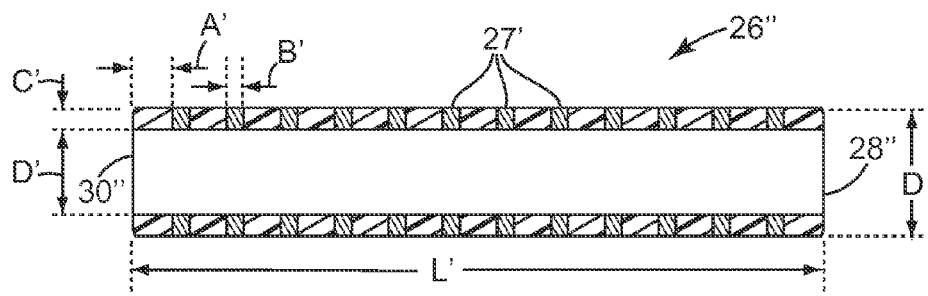
FIG. 3D is a side view of an exemplary corrugated sleeve comprising an inner portion including a plurality of axially spaced-apart corrugations useful in preparing exemplary compression connector assemblies according to exemplary embodiments of the present disclosure.

In certain exemplary embodiments illustrated by FIGS. 3C and 3D, the at least one sleeve includes a multiplicity of axially space-apart corrugations 27-27' formed in at least one of the exterior surface (FIG. 3C) or the interior surface (FIG. 3D). The at least one tubular sleeve has a length L-L', and an exterior surface defined by a third radial dimension (diameter D) less than the first radial dimension of the inner tube 14 (FIG. 2), and an interior surface defining an interiorly hollow portion having a fourth radial dimension (diameter D') less than the third radial dimension, and first 30'-30" and second 28'-28" opposed terminal ends, wherein a difference between the third and fourth radial dimensions is selected to define a wall thickness C-C' such that the at least one sleeve may be inserted into the interior hollow portion of inner tube 14 (FIG. 2).

In certain exemplary embodiments, the axially spaced apart corrugations 27-27' may define a sleeve wall thickness C-C' of from about 0.5 mm to about 6 mm. Preferably, a sleeve with a thin wall thickness, preferably no more than about 4 mm, more preferably no more than about 3 mm, still more preferably no more than about 2.5 mm, and most preferably less than about 2 mm, is selected. The axially space-apart corrugations 27-27' may provide for stress relief during the forging process to form a compression connection.

In further exemplary embodiments, the multiplicity of axially spaced apart corrugations 27-27' is axially spaced apart by a distance B or B' at least about 1 mm, at least 2 mm, at least 3 mm; at most about 5 mm, at most 4 mm, at most 3 mm; or from about 1 mm to about 5 mm, more preferably from about 2 mm to about 4 mm. In certain exemplary embodiments, the multiplicity of axially spaced apart corrugations 27-27' each have a width in the axial direction A or A' of at least about 5 mm, 10 mm or 15 mm; at most about 50 mm, 45 mm, or 40 mm; or from about 5 mm to about 50 mm, more preferably from about 10 mm to about 40 mm. In additional exemplary embodiments, the plurality of axially spaced apart corrugations numbers at least 2, 4, 6, 8 or 10 corrugations 27-27; at most 30, 28, 26, 24, or 22 corrugations 27-27; and preferably from about 2 to about 30 corrugations 27-27; more preferably from about 5 to about 25 corrugations 27-27', most preferably from about 8 to about 20 corrugations 27-27'.

In some presently preferred exemplary embodiments, the first material and the second material comprise at least one metal, wherein the first material exhibits a yield stress of at least about 30 kpsi (at least about 206 MPa), more preferably at least about 35 kpsi (at least about 241 MPa), even more preferably at least about 40 kpsi (at least about 275 MPa); and the second material exhibit a yield stress no greater than about 8 kpsi (no greater than about 56 MPa), more preferably no greater than about 6 kpsi (no greater than about 42 MPa), even more preferably no greater than about 4 kpsi (no greater than about 28 MPa). In certain presently preferred exemplary embodiments, the first material comprises carbon steel, and the second material comprises aluminum.

In additional exemplary embodiments, the compression connectors and assemblies as described above may include an outer and interiorly hollowed tubular body having an interior surface defined by a fifth radial dimension greater than the second radial dimension, and an exterior surface defined by a sixth radial dimension greater than the fifth radial dimension, and first and second opposed terminal ends, the outer tubular body being slidably engaged over the inner tube, optionally wherein the outer tubular body comprises metal.

Thus, in further exemplary embodiments, the compression connector assemblies described herein may include a stranded composite cable having an external radius less than the fifth radial dimension of the outer tubular body, wherein the stranded composite cable comprises a composite core further comprising a single core wire defining a center longitudinal axis, at least a first plurality of composite wires stranded around the single core wire, and at least a second plurality of wires stranded around the first plurality of composite wires, further wherein a terminal portion of the single core wire and the at least first plurality of composite wires extend longitudinally beyond a terminal portion of the at least second plurality of wires, and additionally wherein at least a portion of the terminal portion of the at least first plurality of composite wires has a diameter less than twice the fourth radial dimension of the sleeve, and extends into the interiorly hollow portion of the sleeve.

In some exemplary embodiments, for example, those in which the wall thickness of the at least one sleeve is selected to be from about 0.5 mm to about 6 mm, the compression connector assemblies described above may preferably include a tape wrapping peripherally around the first multiplicity of composite wires and covering only a portion of the first multiplicity of composite wires, wherein the at least second multiplicity of wires is stranded around the first plurality of composite wires and the tape.

In certain exemplary embodiments, the tape covers at most 70%, 60%, 50%, 40%, 30%, 20%, 10%, 5% or even 1% of an outer peripheral surface of the first multiplicity of composite wires. In other exemplary embodiments, for example, those in which the at least one sleeve further includes a multiplicity of axially space-apart corrugations formed in at least one of the exterior surface or the interior surface, the tape may cover from about 30% to about 50% of the outer peripheral surface of the first multiplicity of composite wires. In further exemplary embodiments, the tape covers from about 1% to about 30% of the outer peripheral surface of the first multiplicity of composite wires. Of course, it will be understood that in some exemplary embodiments, no tape wrapping may be used in forming the compression connector assembly.

In certain particular exemplary embodiments of compression connector assemblies as described above, the composite cable connector is a dead end cable connector or a cable splice connector. Thus, in certain exemplary embodiments, the composite connector assembly 10 is a dead end connector, and the outer tubular body includes a terminal application tongue extending from a selected end of the outer tubular body. In some exemplary embodiments, an eyelet may extend from a selected end of the tube and beyond the outer tubular body. In further exemplary embodiments, the eyelet includes a steel eye forging having a selected shape and dimension adapted to engage an insulator string associated with an electrical power transmission line.

Figure 4:
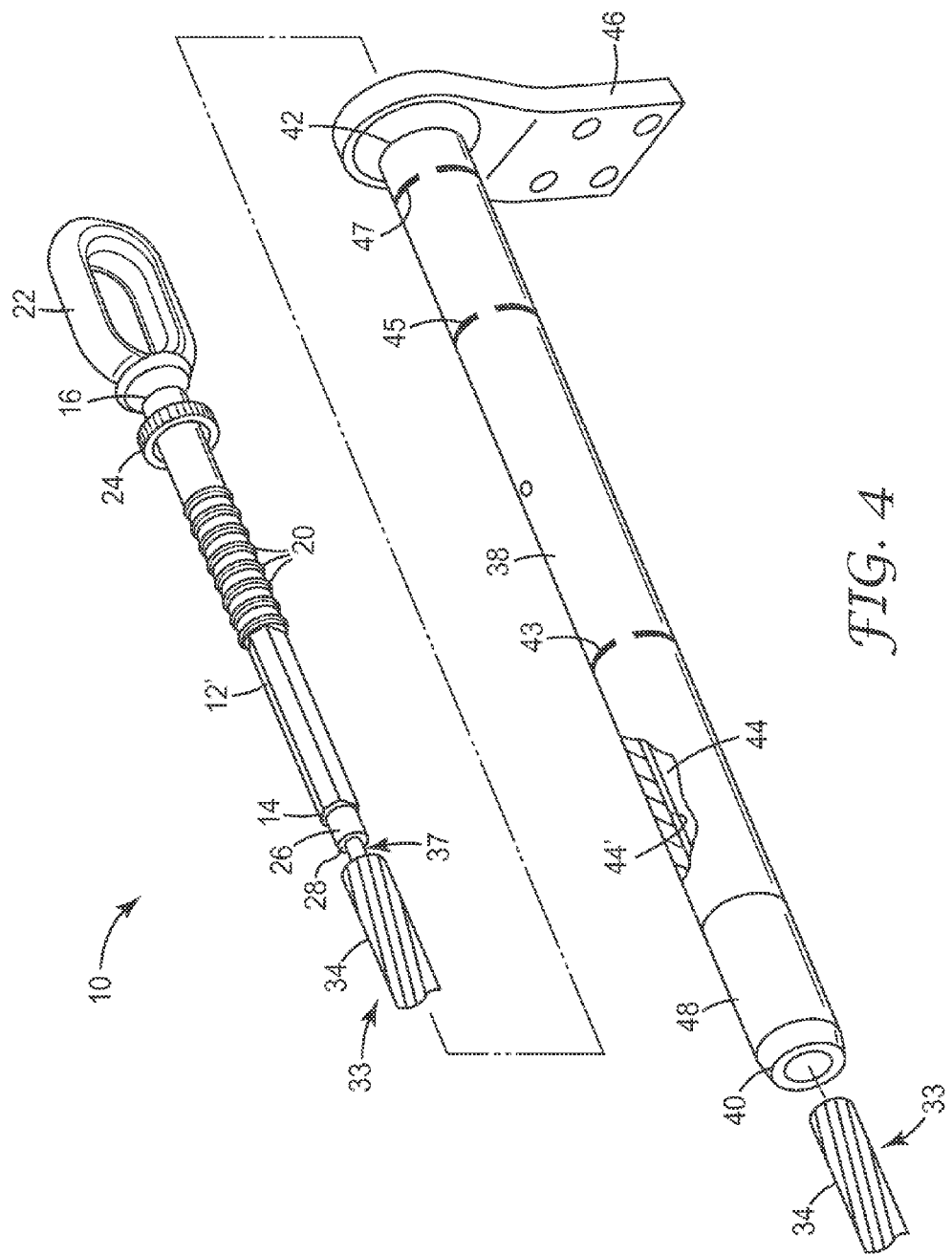
FIG. 4 is an exploded perspective of an exemplary compression dead end connector assembly for use with a stranded composite cable to form a cable termination according to an exemplary embodiment of the present disclosure.

Referring now to the perspective of FIG. 4, an outer tubular body 38 is provided and includes a first end 40, a second end 42 and a specified interior diameter 44. The outer body 38 is constructed of suitable metallic and current conductive material, such as preferably aluminum and in this embodiment is also known as an outer dead-end connector body. The interior diameter 44 of the tubular body 38 also preferably includes the provision of a sleeve 44 which is also preferably constructed of aluminum and may be factory installed during the initial assembly of the outer tubular body 38. Also illustrated is a tongue 46, which is typically a welded portion of the outer body 38, and is also, in certain presently preferred embodiments, constructed of aluminum and operating as a current carrying terminal as will be explained below.

During the initial application and compression forming of the inner tube 12, sleeve 26 and central extending composite wires of the composite cable core 37, the outer dead end body 38 is typically pre-applied in coaxial fashion over the outer wires 34 of the composite cable 33 and is typically positioned a suitable distance from the central extending composite core 37. Following the mechanical compressing and area reducing operation performed on the inner tube 12 (in which it is mechanically shaped from the circular section of FIG. 2 to the substantially hexagonal compressed and formed configuration in FIG. 4) and sleeve 26, the outer dead end and tubular body 38 is slidably engaged over the assembled tube and sleeve in the manner substantially illustrated in the sectional cutaway of FIGS. 2, 4 and 6.

A succeeding and mechanically compressing operation is applied at axially spaced locations indicated at 43, 45 and 47 and along the length of the outer body 38. The compressing operations typically progresses along the axial length of the body 38, to its ends 40 and 42 and to relieve built up stresses in the assembly, however it is understood that no compressing forces are applied between the axial locations 43 and 45, this corresponding to the positioning of the internally inserted tube 12 and sleeve 26. A still further compressing operation may then be performed to an edge adjoining and inwardly tapered section of the outer body (see 48 in FIG. 4) and as with the compressing operations of 43, 45 and 47, mechanically secures the outer tubular body 38 around the outer extending wires 34 of the composite conductor cable as well as relieving stress forces along the assembly.

Figure 6:
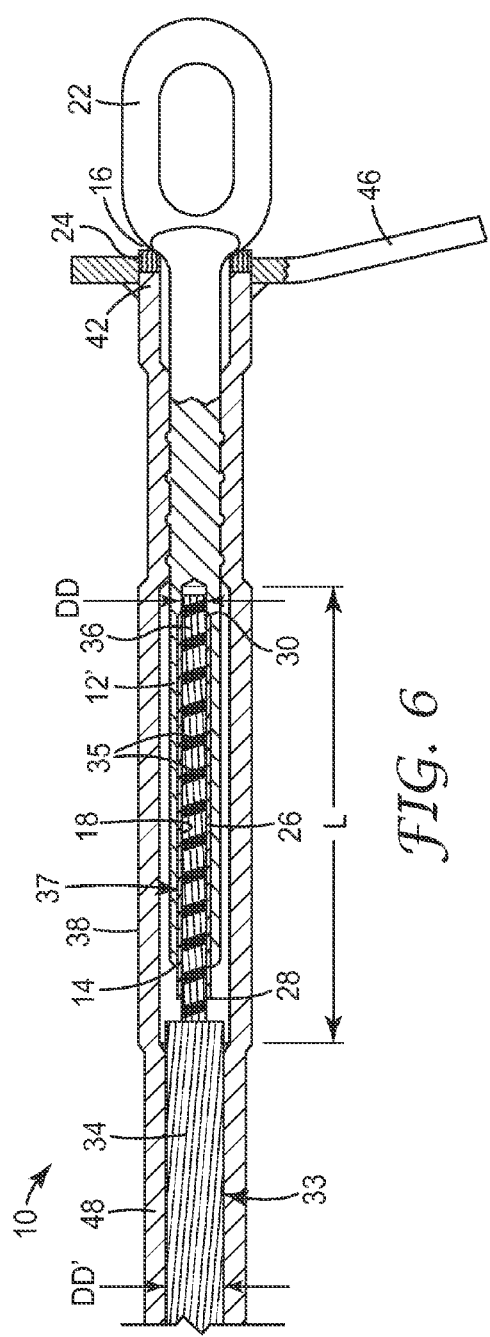
FIG. 6 is a cross-sectional cutaway view of the fully assembled exemplary compression dead end connector assembly of FIG. 4 used to form a cable termination according to an exemplary embodiment of the present disclosure.

Referring once again to the assembled compression dead end connector, illustrated in cross sectional cutaway in FIG. 6, further reference is made to the manner in which the optional axially disposed corrugations 20 on the steel tube 12 are compressed, and radially outwardly deflected, to inter-engage with the opposing and inner annular surface of the outer tubular body 38. This is typically accomplished through applying a specified inward compressing and axial force to the tube 12 and from the heavy duty end extending eyelet 22.

In operation, and upon completed assembly of the compression dead end connector, a jumper terminal (not shown) is connected to the extending tongue 46 of the outer dead end body 38. An insulator string (not shown) is also associated with the aerial tower or pole (also not shown) at the dead end connection and, by its insulating properties, prevents current from passing from the steel eyelet forging 22 and into the pole or tower. Accordingly, the current transfer occurs from the composite cable, through the assembly and across the outer tubular body, and finally through the tongue and to the connected jumper terminal.

The cross sectional configuration of the outer tube 38 may be polygonal, such as hexagonal, and it is also understood that circular and other configurations are also possible. As is also understood at this cross section, the outer tube 38 is designed to hold the strength of the outer aluminum wires 34 of the composite connector cable and further exhibits the necessary current carrying properties to transfer the amperage from the conductor.

The tube and conductor combination are understood to be designed so that each exhibits a desired percentage of area reduction and area compression within established limits, and while the cross section at this location is free of any voids which would tend to allow moisture to travel up the conductor and into the assembly. It is desired that length of compression over the conductor must be adequate to maintain a grip with slippage, such occurring when the conductor is tensioned to 95% of its rated strength in use. In this fashion, it is desirably ensured that the connector will meet the electrical and mechanical performance requirements without the need to repetitively test each and every assembly.

In some exemplary embodiments, the core load transferring section of the connector assembly is designed to yield or elongate at a specific tension, thus effectively "loading" the core. The tube cross section must further be designed such that, upon a load being applied to the conductor which is determined to be at rated breaking strength (RBS), a resulting core (wires 36) strain occurs typically in the area of 0.002 to 0.006 in/in, thus assuring that the core is loaded at high tensile loads.

As with the compression connection established between the outer dead end tubular body 38 and the outer extending wires 34 of the composite terminal cable, the tube 12, sleeve 26 and core 36 is designed to have a percentage area of reduction and percentage area of compression within established limits and in order to ensure the mechanical performance of the compression connection. Furthermore, the cross section at this location is preferably free of voids, such in particular that during the mechanical compress and area reduction the tube will not tend to bend or buckle. Again, the length of compression over the core wires 36 must be adequate to maintain a grip on the conductor core, without slippage, when the cable is tensioned to 95% of its rated strength.

In further exemplary embodiments, the compression connector is a cable splice connector, as shown in FIGS. 5A-5C and FIG. 7, and the at least one sleeve consists essentially of two sleeves 26" and 26'". In some exemplary embodiments, the outer tubular body 84 (FIG. 5C) includes a joint connector body. In certain such exemplary embodiments, the outer tubular body 84 includes at least one metal. Referring now to the perspective illustrations of FIGS. 5A, 5B and 5C, as well as the fully assembled and sectional cutaway of FIG. 7, a compression connector assembly (splice) 62 is illustrated (see in particular FIGS. 5C and 7) according to a second presently preferred embodiment. The compression splice connector assembly 62 operates as a compression joint connector for splicing two composite cables 76 and 80 together, thus contrasting from the dead-end connector assembly 10. Assembly 62 instead is intended to interconnect first and second composite terminals in the manner now described. In particular, an inner tube 64 is again provided and which includes a first end 66, a second end 68, and a specified interior diameter D'. A pair of sleeves, 26" and 26'", is provided, substantially as previously described as sleeve 26, such that the sleeves 26" and 26'" are inserted within the opposite ends 66 and 68 of the steel tube 64.

FIGS. 5A-5B illustrate the pair of sleeves 26" and 26'" having terminal ends 28"-30" and 28'" and 30'", respectively. Sleeves 26"-26'" each have a radial dimension (external diameter D) in opposite end inserted fashion within the tube 64, which has an internal radial dimension (diameter D'). FIG. 5B further illustrates in partially exploded fashion the manner of insertion of a first composite transmission cable (see outer wires 34' having an exterior surface defining a radial dimension (diameter DD') and optional insulating layer 76, and central extending composite wires 36' forming composite core 37' defining a radial dimension (diameter DD), shown with an optional tape wrap 35' as previously described) and a second composite transmission cable (see outer wires 34" defining a radial dimension (diameter DD') and optional insulating layer 81, and central extending composite wires 36" forming composite core 37" defining a radial dimension (diameter DD), shown with an optional tape wrap 35" as previously described).

Figure 7:
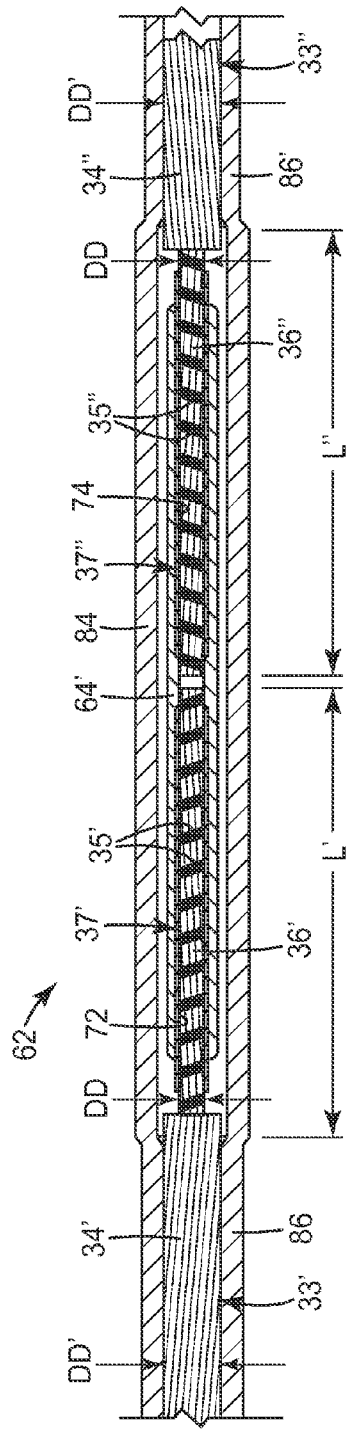
FIG. 7 is a cross-sectional cutaway view of the fully assembled exemplary compression joint connector assembly of FIGS. 5A-5C used to form a cable splice according to an exemplary embodiment of the present disclosure.

Referring now to FIGS. 5C and 7, the axial end insertion of the assembled connector within an outer tubular body 84 associated with the joint connection is illustrated. As with the corresponding outer dead end connector body 38 in the first presently preferred embodiment, the joint connector outer body 84 is constructed of a metallic (typically aluminum) material and is pre-coaxially applied over the outer wires 76 or 80 of a selected transmission connector prior to the initial mechanically compressing and area reducing of the outer tube 64 about the inserted aluminum sleeves 26" and 26'" and inserted central wire wires (cores) 78 and 82 of the terminals.

A supplemental sleeve 81, typically thin-walled and also preferably constructed of aluminum, may be slidably engaged over the transmission cable (outer wires 34'-34") as shown in exploded fashion in FIG. 5C and assembled fashion in FIG. 7. During final assembly, the sleeve 81 slides into the associated end 90 of the outer tubular body 84 and resides flush with the end.

As with the first exemplary embodiment of a dead-end compression connector assembly, the outer tube 64 is mechanically compressed and area reduced, such as from an initial circular configuration to a succeeding and hexagonal compressed/area reduced shape configuration. The extrusion properties of the pair of inserted sleeves 26" and 26'", relative to the steel outer tube 64, are identical to that described with reference to the sleeve 26 in the dead-end connector configuration and such that they combine to both fill voids and irregularities occurring at both of the opposingly extending central composite wires/cores 35'-35" of the associated terminal connectors, as well as further extruding from the opposite ends of the tube outer 64 in order to provide stress relief between the composite cores 35'-35" and the compressed outer tube 84.

End tapered sections 86 and 86' of the outer joint connector body 84 (and which are proximate the opposite ends of the body 84) are concurrently compressed in a secondary mechanical operation (just as previously described with reference to edge section 48 of the dead end tubular body 38 of the first preferred embodiment) and in order to fix the outer tube to the associated outer wires 34' and 34", respectively, of the respective terminal composite cables 33'-33", as well as to relieve stresses along the assembly. In operation, the compression joint connector 62 functions in the identical manner as the corresponding dead-end connector, and with the same performance ratings and requirements. As again stated with respect to the disclosure of the first exemplary embodiment, a desired 95% of the rated strength of the cores 37'-37" (again central extending and wound pluralities of composite wires 36'-36") is desired during subsequent tensioning resulting in use.

In additional exemplary embodiments not illustrated by the drawings, the composite cable compression connection assembly may include a stranded composite core cable having more than three stranded layers of composite wires about the single wire defining a center longitudinal axis. In certain exemplary embodiments, each of the composite wires in each layer of the composite cable may be of the same construction and shape; however this is not required in order to achieve the benefits described herein.

In certain exemplary embodiments, the stranded composite wires each comprise a plurality of continuous fibers in a matrix as will be discussed in more detail later. Because the wires are composite, they do not generally accept plastic deformation during the cabling or stranding operation, which would be possible with ductile metal wires. For example, in prior art arrangements including ductile wires, the conventional cabling process could be carried out so as to permanently plastically deform the composite wires in their helical arrangement. The present disclosure allows use of composite wires which can provide superior desired characteristics compared to conventional ductile metal wires.

In some exemplary embodiments, each of the composite wires is a fiber reinforced composite wire. In certain exemplary embodiments, at least one of the fiber reinforced composite wires is reinforced with one of a fiber tow or a monofilament fiber. In additional exemplary embodiments, each of the composite wires is selected from the group consisting of a metal matrix composite wire and a polymer composite wire. In some exemplary embodiments, the polymer composite wire comprises at least one continuous fiber in a polymer matrix. In further exemplary embodiments, the at least one continuous fiber comprises metal, carbon, ceramic, glass, or combinations thereof. In particular exemplary embodiments, the at least one continuous fiber comprises titanium, tungsten, boron, shape memory alloy, carbon, carbon nanotubes, graphite, silicon carbide, aramid, poly(p-phenylene-2,6-benzobisoxazole, or combinations thereof. In additional exemplary embodiments, the polymer matrix comprises a (co)polymer selected from the group consisting of an epoxy, an ester, a vinyl ester, a polyimide, a polyester, a cyanate ester, a phenolic resin, a bis-maleimide resin, polyetheretherketone, and combinations thereof.

In other exemplary embodiments, the metal matrix composite wire comprises at least one continuous fiber in a metal matrix. In further exemplary embodiments, the at least one continuous fiber comprises a material selected from the group consisting of ceramics, glasses, carbon nanotubes, carbon, silicon carbide, boron, iron, steel, ferrous alloys, tungsten, titanium, shape memory alloy, and combinations thereof. In some exemplary embodiments, the metal matrix comprises aluminum, zinc, tin, magnesium, alloys thereof, or combinations thereof. In certain embodiments, the metal matrix comprises aluminum, and the at least one continuous fiber comprises a ceramic fiber. In certain presently preferred exemplary embodiments, the ceramic fiber comprises polycrystalline $\alpha$-$Al_2O_3$.

In certain embodiments in which the metal matrix composite wire is used to provide an armor element, the fibers are preferably selected from poly(aramid) fibers, ceramic fibers, boron fibers, carbon fibers, metal fibers, glass fibers, and combinations thereof. In certain exemplary embodiments, the armor element comprises a plurality of wires surrounding a core composite cable in a cylindrical layer. Preferably, the wires are selected from metal armor wires, metal matrix composite wires, and combinations thereof.

In certain exemplary embodiments illustrated by FIG. 3B, the stranded composite cable and/or electrically conductive non-composite cable comprising the core comprises at least one, and preferably a plurality of ductile metal wires in an outer wire layer. In additional exemplary embodiments, each of the plurality of metal wires, when viewed in a radial cross section, has a cross-sectional shape selected from the group consisting of circular, elliptical, trapezoidal, S-shaped, and Z-shaped. In some particular exemplary embodiments, the plurality of metal wires comprise at least one metal selected from the group consisting of iron, steel, zirconium, copper, tin, cadmium, aluminum, manganese, zinc, cobalt, nickel, chromium, titanium, tungsten, vanadium, their alloys with each other, their alloys with other metals, their alloys with silicon, and combinations thereof.

In some particular additional exemplary embodiments, at least one of the composite cables is a stranded composite cable comprising a plurality of cylindrical layers of the composite wires stranded about a center longitudinal axis of the at least one composite cable when viewed in a radial cross section. In certain exemplary embodiments, the at least one stranded composite cable is helically stranded. In certain particular exemplary embodiments, each cylindrical layer is stranded at a lay angle in a lay direction that is the same as a lay direction for each adjoining cylindrical layer. In certain presently preferred exemplary embodiments, a relative difference between lay angles for each adjoining cylindrical layer is no greater than 3°.

In further exemplary embodiments, the composite wires have a cross-sectional shape selected from the group consisting of circular, elliptical, and trapezoidal. In some exemplary embodiments, each of the composite wires is a fiber reinforced composite wire. In certain exemplary embodiments, at least one of the fiber reinforced composite wires is reinforced with one of a fiber tow or a monofilament fiber. In other exemplary embodiments, each of the composite wires is selected from the group consisting of a metal matrix composite wire and a polymer composite wire. In certain other exemplary embodiments, the polymer composite wire comprises at least one continuous fiber in a polymer matrix. In some exemplary embodiments, the at least one continuous fiber comprises metal, carbon, ceramic, glass, or combinations thereof.

In some exemplary embodiments, the at least one continuous fiber comprises titanium, tungsten, boron, shape memory alloy, carbon, carbon nanotubes, graphite, silicon carbide, poly(aramid), poly(p-phenylene-2,6-benzobisoxazole, or combinations thereof. In certain exemplary embodiments, the polymer matrix comprises a (co)polymer selected from the group consisting of an epoxy, an ester, a vinyl ester, a polyimide, a polyester, a cyanate ester, a phenolic resin, a bis-maleimide resin, polyetheretherketone, and combinations thereof.

In other exemplary embodiments, the metal matrix composite wire comprises at least one continuous fiber in a metal matrix. In some exemplary embodiments, the at least one continuous fiber comprises a material selected from the group consisting of ceramics, glasses, carbon nanotubes, carbon, silicon carbide, boron, iron, steel, ferrous alloys, tungsten, titanium, shape memory alloy, and combinations thereof. In certain exemplary embodiments, the metal matrix comprises aluminum, zinc, tin, magnesium, alloys thereof, or combinations thereof. In certain presently preferred exemplary embodiments, the metal matrix comprises aluminum, and the at least one continuous fiber comprises a ceramic fiber. In some particular presently preferred exemplary embodiments, the ceramic fiber comprises polycrystalline $\alpha$-$Al_2O_3$.

In further exemplary embodiments, the insulative sheath forms an outer surface of the submersible or underground composite cable. In some exemplary embodiments, the insulative sheath comprises a material selected from the group consisting of a ceramic, a glass, a (co)polymer, and combinations thereof.

While the present disclosure may be practiced with any suitable composite wire, in certain exemplary embodiments, each of the composite wires is selected to be a fiber reinforced composite wire comprising at least one of a continuous fiber tow or a continuous monofilament fiber in a matrix.

A preferred embodiment for the composite wires comprises a plurality of continuous fibers in a matrix. A preferred fiber comprises polycrystalline $\alpha$-$Al_2O_3$. These preferred embodiments for the composite wires preferably have a tensile strain to failure of at least 0.4%, more preferably at least 0.7%. In some embodiments, at least 85% (in some embodiments, at least 90%, or even at least 95%) by number of the fibers in the metal matrix composite core are continuous.

Other composite wires that could be used with the present disclosure include glass/epoxy wires; silicon carbide/aluminum composite wires; carbon/aluminum composite wires; carbon/epoxy composite wires; carbon/polyetheretherketone (PEEK) wires; carbon/(co)polymer wires; and combinations of such composite wires.

Examples of suitable glass fibers include A-Glass, B-Glass, C-Glass, D-Glass, S-Glass, AR-Glass, R-Glass, fiberglass and paraglass, as known in the art. Other glass fibers may also be used; this list is not limited, and there are many different types of glass fibers commercially available, for example, from Corning Glass Company (Corning, N.Y.).

In some exemplary embodiments, continuous glass fibers may be preferred. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Examples of suitable ceramic fibers include metal oxide (e.g., alumina) fibers, boron nitride fibers, silicon carbide fibers, and combination of any of these fibers. Typically, the ceramic oxide fibers are crystalline ceramics and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous ceramic fibers have an average fiber diameter in a range from about 5 micrometers to about 50 micrometers, about 5 micrometers to about 25 micrometers about 8 micrometers to about 25 micrometers, or even about 8 micrometers to about 20 micrometers. In some embodiments, the crystalline ceramic fibers have an average tensile strength of at least 1.4 GPa, at least 1.7 GPa, at least 2.1 GPa, and or even at least 2.8 GPa. In some embodiments, the crystalline ceramic fibers have a modulus greater than 70 GPa to approximately no greater than 1000 GPa, or even no greater than 420 GPa.

Examples of suitable monofilament ceramic fibers include silicon carbide fibers. Typically, the silicon carbide monofilament fibers are crystalline and/or a mixture of crystalline ceramic and glass (i.e., a fiber may contain both crystalline ceramic and glass phases). Typically, such fibers have a length on the order of at least 50 meters, and may even have lengths on the order of kilometers or more. Typically, the continuous silicon carbide monofilament fibers have an average fiber diameter in a range from about 100 micrometers to about 250 micrometers. In some embodiments, the crystalline ceramic fibers have an average tensile strength of at least 2.8 GPa, at least 3.5 GPa, at least 4.2 GPa and or even at least 6 GPa. In some embodiments, the crystalline ceramic fibers have a modulus greater than 250 GPa to approximately no greater than 500 GPa, or even no greater than 430 GPa.

Suitable alumina fibers are described, for example, in U.S. Pat. No. 4,954,462 (Wood et al.) and U.S. Pat. No. 5,185,299 (Wood et al.). In some embodiments, the alumina fibers are polycrystalline alpha alumina fibers and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than one micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa). Exemplary alpha alumina fibers are marketed under the trade designation "NEXTEL 610" (3M Company, St. Paul, Minn.).

Suitable aluminosilicate fibers are described, for example, in U.S. Pat. No. 4,047,965 (Karst et al). Exemplary aluminosilicate fibers are marketed under the trade designations "NEXTEL 440", "NEXTEL 550", and "NEXTEL 260" by 3M Company of St. Paul, Minn. Aluminoborosilicate fibers are described, for example, in U.S. Pat. No. 3,795,524 (Sowman). Exemplary aluminoborosilicate fibers are marketed under the trade designation "NEXTEL 312" by 3M Company. Boron nitride fibers can be made, for example, as described in U.S. Pat. No. 3,429,262 (Economy) and U.S. Pat. No. 5,780,154 (Okano et al.). Exemplary silicon carbide fibers are marketed, for example, by COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Suitable carbon fibers include commercially available carbon fibers such as the fibers designated as PANEX® and PYRON® (available from ZOLTEK, Bridgeton, Mo.), THORNEL (available from CYTEC Industries, Inc., West Paterson, N.J.), HEXTOW (available from HEXCEL, Inc., Southbury, Conn.), and TORAYCA (available from TORAY Industries, Ltd. Tokyo, Japan). Such carbon fibers may be derived from a polyacrylonitrile (PAN) precursor. Other suitable carbon fibers include PAN-IM, PAN-HM, PAN UHM, PITCH or rayon byproducts, as known in the art.

Additional suitable commercially available fibers include ALTEX (available from Sumitomo Chemical Company, Osaka, Japan), and ALCEN (available from Nitivy Company, Ltd., Tokyo, Japan).

Suitable fibers also include shape memory alloy (i.e., a metal alloy that undergoes a Martensitic transformation such that the metal alloy is deformable by a twinning mechanism below the transformation temperature, wherein such deformation is reversible when the twin structure reverts to the original phase upon heating above the transformation temperature). Commercially available shape memory alloy fibers are available, for example, from Johnson Matthey Company (West Whiteland, Pa.).

In some embodiments the ceramic fibers are in tows. Tows are known in the fiber art and refer to a plurality of (individual) fibers (typically at least 100 fibers, more typically at least 400 fibers) collected in a roving-like form. In some embodiments, tows comprise at least 780 individual fibers per tow, in some cases at least 2600 individual fibers per tow, and in other cases at least 5200 individual fibers per tow. Tows of ceramic fibers are generally available in a variety of lengths, including 300 meters, 500 meters, 750 meters, 1000 meters, 1500 meters, 2500 meters, 5000 meters, 7500 meters, and longer. The fibers may have a cross-sectional shape that is circular or elliptical.

Commercially available fibers may typically include an organic sizing material added to the fiber during manufacture to provide lubricity and to protect the fiber wires during handling. The sizing may be removed, for example, by dissolving or burning the sizing away from the fibers. Typically, it is desirable to remove the sizing before forming metal matrix composite wire. The fibers may also have coatings used, for example, to enhance the wettability of the fibers, to reduce or prevent reaction between the fibers and molten metal matrix material. Such coatings and techniques for providing such coatings are known in the fiber and composite art.

In further exemplary embodiments, each of the composite wires is selected from a metal matrix composite wire and a polymer composite wire. Suitable composite wires are disclosed, for example, in U.S. Pat. Nos. 6,180,232; 6,245,425; 6,329,056; 6,336,495; 6,344,270; 6,447,927; 6,460,597; 6,544,645; 6,559,385, 6,263,451; and 7,093,416.

One presently preferred fiber reinforced metal matrix composite wire is a ceramic fiber reinforced aluminum matrix composite wire. The ceramic fiber reinforced aluminum matrix composite wires preferably comprise continuous fibers of polycrystalline $\alpha$-$Al_2O_3$ encapsulated within a matrix of either substantially pure elemental aluminum or an alloy of pure aluminum with up to about 2% by weight copper, based on the total weight of the matrix. The preferred fibers comprise equiaxed grains of less than about 100 nm in size, and a fiber diameter in the range of about 1-50 micrometers. A fiber diameter in the range of about 5-25 micrometers is preferred with a range of about 5-15 micrometers being most preferred.

Preferred fiber reinforced composite wires to the present disclosure have a fiber density of between about 3.90-3.95 grams per cubic centimeter. Among the preferred fibers are those described in U.S. Pat. No. 4,954,462 (Wood et al., assigned to Minnesota Mining and Manufacturing Company, St. Paul, Minn.). Preferred fibers are available commercially under the trade designation "NEXTEL 610" alpha alumina based fibers (available from 3M Company, St. Paul, Minn.). The encapsulating matrix is selected to be such that it does not significantly react chemically with the fiber material (i.e., is relatively chemically inert with respect the fiber material, thereby eliminating the need to provide a protective coating on the fiber exterior.

In certain presently preferred exemplary embodiments of a composite wire, the use of a matrix comprising either substantially pure elemental aluminum, or an alloy of elemental aluminum with up to about 2% by weight copper, based on the total weight of the matrix, has been shown to produce successful wires. As used herein the terms "substantially pure elemental aluminum", "pure aluminum" and "elemental aluminum" are interchangeable and are intended to mean aluminum containing less than about 0.05% by weight impurities.

In one presently preferred embodiment, the composite wires comprise between about 30-70% by volume polycrystalline $\alpha$-$Al_2O_3$ fibers, based on the total volume of the composite wire, within a substantially elemental aluminum matrix. It is presently preferred that the matrix contains less than about 0.03% by weight iron, and most preferably less than about 0.01% by weight iron, based on the total weight of the matrix. A fiber content of between about 40-60% polycrystalline $\alpha$-$Al_2O_3$ fibers is preferred. Such composite wires, formed with a matrix having a yield strength of less than about 20 MPa and fibers having a longitudinal tensile strength of at least about 2.8 GPa have been found to have excellent strength characteristics.

The matrix may also be formed from an alloy of elemental aluminum with up to about 2% by weight copper, based on the total weight of the matrix. As in the embodiment in which a substantially pure elemental aluminum matrix is used, composite wires having an aluminum/copper alloy matrix preferably comprise between about 30-70% by volume polycrystalline $\alpha$-$Al_2O_3$ fibers, and more preferably therefore about 40-60% by volume polycrystalline $\alpha$-$Al_2O_3$ fibers, based on the total volume of the composite. In addition, the matrix preferably contains less than about 0.03% by weight iron, and most preferably less than about 0.01% by weight iron based on the total weight of the matrix. The aluminum/copper matrix preferably has a yield strength of less than about 90 MPa, and, as above, the polycrystalline $\alpha$-$Al_2O_3$ fibers have a longitudinal tensile strength of at least about 2.8 GPa.

Composite wires preferably are formed from substantially continuous polycrystalline $\alpha$-$Al_2O_3$ fibers contained within the substantially pure elemental aluminum matrix or the matrix formed from the alloy of elemental aluminum and up to about 2% by weight copper described above. Such wires are made generally by a process in which a spool of substantially continuous polycrystalline $\alpha$-$Al_2O_3$ fibers, arranged in a fiber tow, is pulled through a bath of molten matrix material. The resulting segment is then solidified, thereby providing fibers encapsulated within the matrix.

Exemplary metal matrix materials include aluminum (e.g., high purity, (e.g., greater than 99.95%) elemental aluminum, zinc, tin, magnesium, and alloys thereof (e.g., an alloy of aluminum and copper). Typically, the matrix material is selected such that the matrix material does not significantly chemically react with the fiber (i.e., is relatively chemically inert with respect to fiber material), for example, to eliminate the need to provide a protective coating on the fiber exterior. In some embodiments, the matrix material desirably includes aluminum and alloys thereof.

In some embodiments, the metal matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight Al and up to 2 percent by weight Cu. In some embodiments, useful alloys are 1000, 2000, 3000, 4000, 5000, 6000, 7000 and/or 8000 series aluminum alloys (Aluminum Association designations). Although higher purity metals tend to be desirable for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities)) can be obtained, for example, from Belmont Metals, New York, N.Y. Zinc and tin are available, for example, from Metal Services, St. Paul, Minn. ("pure zinc"; 99.999% purity and "pure tin"; 99.95% purity). For example, magnesium is available under the trade designation "PURE" from Magnesium Elektron, Manchester, England. Magnesium alloys (e.g., WE43A, EZ33A, AZ81A, and ZE41A) can be obtained, for example, from TIMET, Denver, Colo.

The metal matrix composite wires typically comprise at least 15 percent by volume (in some embodiments, at least 20, 25, 30, 35, 40, 45, or even 50 percent by volume) of the fibers, based on the total combined volume of the fibers and matrix material. More typically the composite cores and wires comprise in the range from 40 to 75 (in some embodiments, 45 to 70) percent by volume of the fibers, based on the total combined volume of the fibers and matrix material.

Metal matrix composite wires can be made using techniques known in the art. Continuous metal matrix composite wire can be made, for example, by continuous metal matrix infiltration processes. One suitable process is described, for example, in U.S. Pat. No. 6,485,796 (Carpenter et al.). Wires comprising polymers and fiber may be made by pultrusion processes which are known in the art.

In additional exemplary embodiments, the composite wires are selected to include polymer composite wires. The polymer composite wires comprise at least one continuous fiber in a polymer matrix. In some exemplary embodiments, the at least one continuous fiber comprises metal, carbon, ceramic, glass, and combinations thereof. In certain presently preferred exemplary embodiments, the at least one continuous fiber comprises titanium, tungsten, boron, shape memory alloy, carbon nanotubes, graphite, silicon carbide, boron, poly (aramid), poly(p-phenylene-2,6-benzobisoxazole)3, and combinations thereof. In additional presently preferred exemplary embodiments, the polymer matrix comprises a (co) polymer selected from an epoxy, an ester, a vinyl ester, a polyimide, a polyester, a cyanate ester, a phenolic resin, a bis-maleimide resin, and combinations thereof.

Ductile metal wires for stranding around a composite core to provide a composite cable, e.g. an electrical power transmission cable according to certain embodiments of the present disclosure, are known in the art. Preferred ductile metals include iron, steel, zirconium, copper, tin, cadmium, aluminum, manganese, and zinc; their alloys with other metals and/or silicon; and the like. Copper wires are commercially available, for example from Southwire Company, Carrolton, Ga. Aluminum wires are commercially available, for example from Nexans, Weyburn, Canada or Southwire Company, Carrolton, Ga. under the trade designations "1350-H19 ALUMINUM" and "1350-HO ALUMINUM".

Typically, copper wires have a thermal expansion coefficient in a range from about 12 ppm/° C. to about 18 ppm/° C. over at least a temperature range from about 20° C. to about 800° C. Copper alloy (e.g. copper bronzes such as Cu—Si—X, Cu—Al—X, Cu—Sn—X, Cu—Cd; where X=Fe, Mn, Zn, Sn and or Si; commercially available, for example from Southwire Company, Carrolton, Ga.; oxide dispersion strengthened copper available, for example, from OMG Americas Corporation, Research Triangle Park, N.C., under the designation "GLIDCOP") wires. In some embodiments, copper alloy wires have a thermal expansion coefficient in a range from about 10 ppm/° C. to about 25 ppm/° C. over at least a temperature range from about 20° C. to about 800° C. The wires may be in any of a variety shapes (e.g., circular, elliptical, and trapezoidal).

Typically, aluminum wire have a thermal expansion coefficient in a range from about 20 ppm/° C. to about 25 ppm/° C. over at least a temperature range from about 20° C. to about 500° C. In some embodiments, aluminum wires (e.g., "1350-H19 ALUMINUM") have a tensile breaking strength, at least 138 MPa (20 kpsi), at least 158 MPa (23 kpsi), at least 126" MPa (25 kpsi) or at least 186 MPa (27 kpsi) or at least 200 MPa (29 kpsi). In some embodiments, aluminum wires (e.g., "1350-HO ALUMINUM") have a tensile breaking strength greater than 41 MPa (6 kpsi) to no greater than 97 MPa (14 kpsi), or even no greater than 83 MPa (12 kpsi).

Aluminum alloy wires are commercially available, for example, aluminum-zirconium alloy wires sold under the trade designations "ZTAL," "XTAL," and "KTAL" (available from Sumitomo Electric Industries, Osaka, Japan), or "6201" (available from Southwire Company, Carrolton, Ga.). In some embodiments, aluminum alloy wires have a thermal expansion coefficient in a range from about 20 ppm/° C. to about 25 ppm/° C. over at least a temperature range from about 20° C. to about 500° C.

The weight percentage of composite wires within the submersible or underground composite cable will depend upon the design of the submersible or underground cable and the conditions of its intended use. In most applications in which the stranded composite cable is to be used as a component in a submersible or underground composite cable, it is preferred that the stranded composite cable be free of electrical power conductor layers around the plurality of composite cables. In certain presently preferred exemplary embodiments, the submersible or underground composite cable exhibits a strain to break limit of at least 0.5%.

The present disclosure is preferably carried out so as to provide very long submersible or underground composite cables. It is also preferable that the composite wires within the stranded composite cable 10 themselves are continuous throughout the length of the stranded composite cable. In one preferred embodiment, the composite wires are substantially continuous and at least 150 meters long. More preferably, the composite wires are continuous and at least 250 meters long, more preferably at least 500 meters, still more preferably at least 750 meters, and most preferably at least 1000 meters long in the stranded composite cable 10.

In another aspect, the present disclosure provides a method of constructing a compression connector as described above, including: axially inserting the sleeve into the interiorly hollow portion of the tube, inserting the terminal portion of the single core wire and the at least first plurality of composite wires into the interiorly hollow portion of the sleeve, after inserting the terminal portion of the single core wire and the at least first plurality of composite wires into the interiorly hollow portion of the sleeve and axially inserting the sleeve into the interiorly hollow portion of the tube, mechanically compressing the tube in a direction substantially orthogonal to the exterior surface of the tube, thereby deforming the tube and the sleeve such that the first and second materials extrude axially at substantially the same rate, and optionally, thereafter slidably engaging the outer tubular body over the tube to at least partially cover the tube.

In certain exemplary embodiments, mechanically compressing the tube in a direction substantially orthogonal to the exterior surface of the tube includes mechanically compressing the elongated tube in a forging die. In some exemplary embodiments, the forging die mechanically compresses only a portion of the inner tube. In certain presently preferred embodiments, the forging die mechanically compresses substantially the entire length of the sleeve. In further presently preferred exemplary embodiments, the forging die has a length, and the terminal portion of the single core wire and the at least first plurality of composite wires form a cylindrical composite core having a diameter, wherein the ratio of the forging die length to the composite core diameter is no greater than about 6.

Further optional method steps include mechanically compressing the outer tubular body against the outer wires of the composite cable, securing a terminal application tongue to a selected end of the outer tubular body in the dead-end compression connection, as well as forming a plurality of axially spaced apart corrugations along an exterior diameter of the compressing inner tube along with an optional eyelet extending from a selected end of the inner tube proximate to the plurality of spaced-apart corrugations. The step of axially compressing the inner tube, such that the corrugations compress and radially expand to fixedly engaging against the interior diameter of the outer tubular body, may complete the assembly method of the composite cable compression connector (dead-end connector) according to certain exemplary embodiments of the disclosure.

EXAMPLES

Exemplary embodiments of the present disclosure have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

Furthermore, notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Preparation of Composite Cable Compression Connection Assemblies

Compression connection fittings (e.g. dead-end connector components as shown generally in FIG. 4 and cable splice connector components as shown in FIGS. 5A-5C) were obtained from ACA Conductor Accessories (Duncan, S.C.). The supplier recommended hydraulically-driven press and dies were used for the forging operation. Forging a composite cable compression connection assembly required multiple "bites" or compressions onto the composite core/compression connector. Each bite of the die was overlapped with the previous one as the compression connector was moved from one end of the composite compression connector assembly to the other (for a dead-end connector) or from the middle to each end (for a splice connector). During forging, we would listen for audible "clicks" or "pops" as the dies reached full closure that would correspond to the fracture of core wires. Additionally, we would hold onto the core or conductor sample and feel for a "twitch" or "jump" that would correspond to a fracture of the core wires.

Testing of Composite Cable Compression Connection Assemblies

Tensile testing of completed composite cable compression connection assemblies were carried out as follows. Using a 10 ft (3.05 m) length of composite core cable, one of two possible tensile test samples was prepared, depending on whether the compression connector was a composite cable dead end connector, or a composite cable splice connector. For a dead end connector, the tensile test sample was prepared by forging a composite compression connector assembly onto one end of the composite core cable and then applying a resin cone on the other end of the composite core cable. For a cable splice connector, the tensile test sample was prepared by cutting the composite core cable in half, then reconnecting the cut ends using a splice composite compression connector assembly. Resin cones were then applied to the two free ends of the spliced composite core cable, and the sample was subjected to tensile testing in an Instron tester.

When samples were tensile tested, the primary measurement reported is the maximum axial force the composite compression connector assembly will support. Failure is usually via failure of the composite core inside the composite compression connector assembly at high load, or via sliding of the composite core out of the composite compression connector assembly at relatively lower load, or the composite core is pre-broken inside the composite compression connector assembly during forging and a short length of composite wire slides out of the compression connector assembly at ultra-low load.

Measurement of Vickers Hardness

In some of the following examples, the Vickers hardness of the aluminum sleeve (insert) (sleeve) was measured. The corresponding hardness value is expressed in units of Vickers Hardness, HV (200 g), when a 200 grams load is applied. The relationship between Vickers Hardness in aluminum tubes and tensile stress at 1% strain was determined in this manner. The stress at 1% strain ($S_{1\%}$) is approximated by the following equation (units of strength unit are kpsi, wherein 1 kpsi=about 6.9 MPa):

$$S_1\% = 0.4\, HV(200\,g) - 2 \tag{1}$$

Example 1

Aluminum Sleeve Hardness Study (795 Composite Core Cable)

Two (splice) composite compression connector assemblies were forged using 795 ACCR composite core wire (available from 3M Company, St. Paul, Minn.). This is a 19 v 0.083" conventionally stranded composite core cable construction. The following die compression conditions were used:

Reduction ratio=8%
Length of core inside composite compression connector assembly=5 inches
Die used=10018SH-LG
Die bite length=2.1 inches (approximately)
Tape Coverage on core=65-70%
Number of bites per side of splice=3
Overlap of bites=1 inch Results:

Composite Compression Connector Assembly #1

The measured aluminum sleeve (insert) hardness was 35.5 HV (200 g). The maximum load supported in the tensile test was 2,805 lbs (1275 kg) or about 14.9% of rated breaking strength (RBS). Failure occurred via the core pulling out of the splice (a 2 inch (about 5.1 cm) long piece of composite core pulled out of the compression connector). The composite core began slipping out almost immediately upon application of load. We concluded that composite core wires were broken during forging by compression of the compression connector (the break was at the center of the $2^{nd}$ die bite).

Composite Compression Connector Assembly #2

The composite compression connector assembly aluminum sleeve (insert) hardness was 22.5 HV (200 g). The maximum load supported was 14,080 lbs or about 26.9% of RBS. Failure occurred via the composite core fracturing within the splice during the test. The composite core slipped out approximately 0.5 inches (1.27 cm) prior to failure. Thus, in some exemplary embodiments, the soft aluminum is a better choice than hard aluminum for the property of the aluminum sleeve insert. The hard aluminum may cause failure of the composite core, while the soft aluminum apparently does not.

Example 2

Tape Wrapping Study (795 Composite Core Cable)

Seven (splice) composite compression connector assemblies were forged using 795 ACCR composite core wire (available from 3M Company, St. Paul, Minn.). This is a 19 v 0.083" core construction. The following die compression conditions were used:

Reduction ratio=8%
Length of core inside composite compression connector assembly=5 inches
Die used=10018SH-LG
Die bite length=2.1 inches (approx)
Tape Coverage on core=variable
Number of bites per side of splice=3
Overlap of bites=1 inch The measured aluminum sleeve (insert) hardness was 35.5 HV (200 g). The results are summarized in Table 1.

TABLE 1

| Sample | % Tape Coverage | $1^{st}$ bite | $2^{nd}$ bite | $3^{rd}$ bite | Comments |
|---|---|---|---|---|---|
| 1 | 60% | OK | Break | OK | Broken core |
| 2 | 65% | OK | Break | OK | Broken core |
| 3 | 71% | OK | Break | OK | Broken core |
| 4 | 75% | OK | OK | OK | Intact |
| 5 | 80% | OK | OK | OK | Intact |
| 6 | 100% | OK | OK | OK | Intact |
| 7 | 100% | OK | OK | OK | Intact |

Thus, in some exemplary embodiments, by increasing the amount of tape wrapping surrounding the exterior surface of the composite core, the core breakage during forging may be suppressed.

Example 3

Tape Wrapping Study (795 Composite Core Cable)

One (splice) composite compression connector assembly was forged using 795 ACCR composite wire core cable (available from 3M Company, St. Paul, Minn.). This is a 19×0.083" core construction. The following die compression conditions were used:

Reduction ratio=8%
Length of core inside composite compression connector assembly=5 inches
Die used=10018SH-LG
Die bite length=2.1 inches (approx)
Tape Coverage on core=90%
Number of bites per side of splice=3
Overlap of bites=1 inch
Results:

The measured aluminum sleeve (insert) hardness was 35.5 HV (200 g). The maximum load supported in the tensile test was 11560 lbs (61.5% RBS). Failure occurred via the core pulling out of the splice (all 5 inches came out). The composite core slipped out approximately 0.5 inches prior to failure.

Thus, although the composite core wires remained intact, the holding strength was reduced (less than 80% RBS) with 90% tape coverage. Thus, in some exemplary embodiments, adding more tape, while maintaining composite core integrity, also promotes composite wire slippage.

Example 4

Tape Wrapping Study (795 Composite Core Cable)

Seven (splice) composite compression connector assemblies were forged using 795 ACCR composite wire core cable (available from 3M Company, St. Paul, Minn.). This is a 19 v 0.083" core construction. The following die compression conditions were used:

Reduction ratio=8%
Length of core inside composite compression connector assembly=5 inches
Die used=10018SH-LG
Die bite length=2.1 inches (approx)
Tape Coverage on core=variable
Number of bites per side of splice=3
Overlap of bites=1 inch The measured aluminum sleeve (insert) hardness was 22.5 HV (200 g). The results are summarized in Table 2.

TABLE 2

| Sample # | % Tape Coverage | Max. load (lbs) | % RBS | Comments |
|---|---|---|---|---|
| 1 | 0% | 8880 | 47% | Pre-broken 2" inside core from forging - slipped out in test |
| 2 | 30% | 18765 | 100% | Core fracture during test in grip |
| 3 | 50% | 16080 | 85% | Core fracture during test in grip |
| 4 | 65-70% | 14080 | 75% | Core fracture during test in grip |
| 5 | 65-70% | 13050 | 69% | Fully slipped out (all 5") |
| 6 | 100% | 10385 | 55% | Fully slipped out (all 5") |
| 7 | 100% | 9430 | 50% | Fully slipped out (all 5") + had two layers of tape |

Other than the 0% tape coverage (which broke the core during forging), the holding strength is approximately a linear function of the tape coverage. Thus, in some exemplary embodiments, use of a soft (i.e. low yield stress) aluminum sleeve (insert) permit the use of lower tape coverage levels (without core breakage) that may in turn lead to greater holding strengths. Because it may, in some embodiments, be desirable to achieve holding strengths greater than 80%, tape coverage levels in the range 30-50% may be particularly desirable.

Example 5

Tape Wrapping Study (477 Composite Core Cable)

Three (deadend) composite compression connector assemblies were forged using 477 ACCR composite core cable (available from 3M Company, St. Paul, Minn.). This is a 7 v 0.105" composite core cable construction. The following die compression conditions were used:

Reduction ratio=12%
Length of core inside composite compression connector assembly=5 inches
Die used=10014SH
Die bite length=1.2 inches (approx)
Tape Coverage on core=variable
Number of bites per grip=6
Overlap of bites=¼ inch The measured aluminum sleeve (insert) hardness was 18.4 HV (200 g). The results are summarized in Table 3.

TABLE 3

| Sample # | % Tape Coverage | Max. load (lbs) | % RBS | Comments |
|---|---|---|---|---|
| 1 | 50% | 12250 | 107% | No failure at composite compression connector assembly - broke at resin fitting. |
| 2 | 70% | 9930 | 87% | Core fracture during test in grip |
| 3 | 90% | 4675 | 41% | Full 5" slipped out in test |

Thus, in some exemplary embodiments, the holding strength is approximately a linear function of the amount of tape coverage. This confirms the same data trend for tape coverage, but on a system that uses a higher reduction ratio during compressing (12% vs. 8%). Taping levels for composite cores of 477 ACCR are typically 85-95%. These data suggest 50-70% tape coverage may be preferred for certain exemplary embodiments.

Example 6

Die Length Study (477 Composite Core Cable)

Two (deadend) composite compression connector assemblies were forged using 477 ACCR composite core cable (available from 3M Company, St. Paul, Minn.). This is a 7 v 0.105" composite wire core cable. The following die compression conditions were used:
Reduction ratio=12%
Length of core inside composite compression connector assembly=5 inches
Die used on core #1=10014SH (Die bite length=1.2 inches (approx))
Die used on core #2=10014SH-LG (Die bite length=2.2 inches (approx))
Tape Coverage on core=90%
Number of bites (short die) per grip=6
Number of bites (long die) per grip=3
Overlap of bites=¼ inch
The measured aluminum sleeve (insert) hardness was 18.4 HV (200 g). The results are summarized in Table 4.

TABLE 4

| Sample | Die length | Insert Hardness | % Tape coverage | Core Breakage during forging |
|---|---|---|---|---|
| 1 | 1.2" | 18 HV | 90 | NO |
| 2 | 2.2" | 18 HV | 90 | YES |

These Examples confirm that, in some exemplary embodiments, shorter dies may prevent the composite core from breaking during forging.

Example 7

Die Length Study (300 Composite Core Cable)

Five (deadend) composite compression connector assemblies were forged using 300 ACCR composite core cable (available from 3M Company, St. Paul, Minn.). This is a 7 v 0.083" composite wire core cable. The following die compression conditions were used:
Reduction ratio=8%
Length of core inside composite compression connector assembly=5 inches
Die used on core #1=10014SH (Die bite length=1.2 inches (approx))
Die used on core #2=10014SH-LG (Die bite length=2.2 inches (approx))
Tape Coverage on core=variable (typical manufacturing is 100%)
Number of bites (short die) per grip=6
Number of bites (long die) per grip=3
Overlap of bites=¼ inch
The measured aluminum sleeve (insert) hardness was 25-30 HV (200 g). The results are summarized in Table 5.

TABLE 5

| Sample # | % Tape Coverage | Max. load (lbs) | % RBS | Comments |
|---|---|---|---|---|
| 1 | 100% | 2685 | 37% | Short Die Wires slipped out full 5" |
| 2 | 100% | 3295 | 46% | Short Die Wires slipped out full 5" |
| 3 | 80% | | | Short Die Wires slipped out full 5" |
| 4 | 80% | 925 | 13% | Long Die Wires slipped out 2" - was broken during forging |
| 5 | 100% | 1750 | 24% | Long Die Wires slipped out full 5" |

These Examples confirm the importance of die length and tape coverage in some exemplary embodiments, in order to obtain good holding strength Example 7

Corrugated Sleeve Study (300 Composite Core Cable)

An example was conducted to evaluate the performance of aluminum sleeves (inserts) having a series of machined slots (i.e. a plurality of corrugations) in the exterior surface, as shown in FIG. 3C and described in the following Example. This design was selected so that the corrugations might serve as "strain relief" during the forging process, to reduce axial tension on the core and prevent wire breaks. If this permitted a reduction in core tape coverage, we could also obtain improved gripping force.

Composite compression connector assemblies were forged using 795-T16 ACCR composite core cable (available from 3M Company, St. Paul, Minn.). This is a 19×0.089" composite wire core cable. The following die compression conditions were used:
Reduction ratio=8%
Length of core inside composite compression connector assembly=5"
Die used=10018SH-LG
Die bite length=2.1" (approx)
Tape coverage on core=0% (no tape)
Accessory type=dead-end
Number of bites=3
Overlap of bites=1"
The measured aluminum sleeve (insert) hardness was 24.4 (Hv 200 g). Two different slotted inserts, one with 14 equally-spaced corrugations, and a second with 8 equally-spaced corrugations of the same size, were used to fabricate (deadend) composite compression connector assemblies without using a tape wrapping around the composite core wires. Inspection of the forged assemblies showed essentially no extrusion of the aluminum sleeve (insert) relative to the outer steel tube. There was no core wire breakage in either case.

Figure 9:
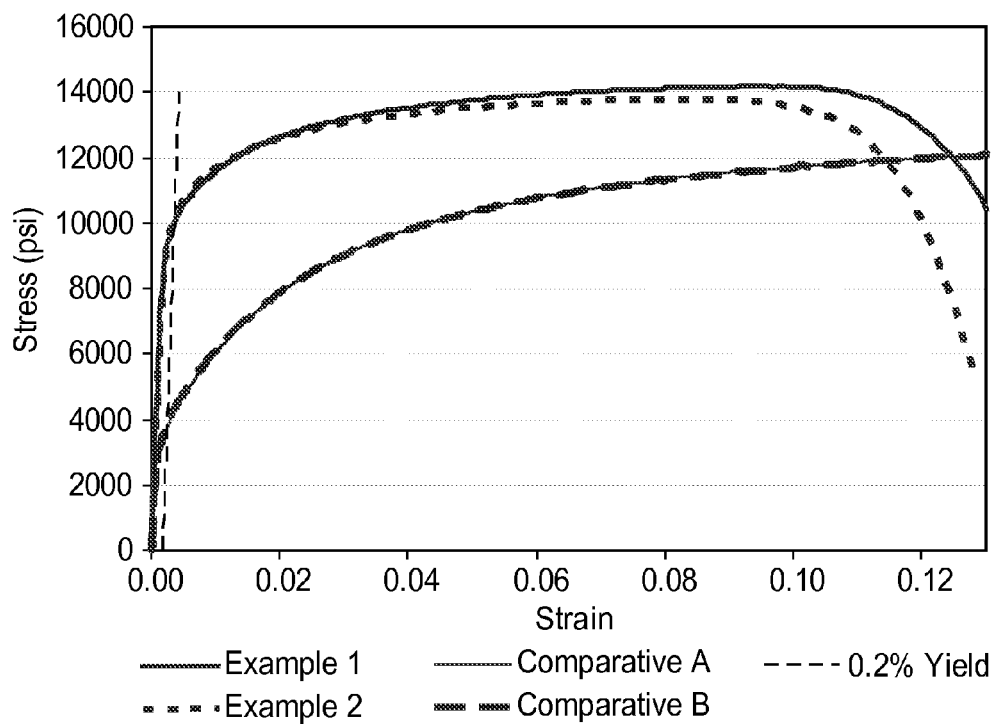
FIG. 9 is a graph showing a plot of measured stress as a function of applied strain for illustrative examples and comparative examples of compression connector assemblies for exemplary composite cables, prepared according to the present disclosure.

Tensile testing of these two forgings gave peak loads of 14,047 lbs (75% RBS) and 14,639 lbs (78% RBS), respectively. The results are plotted in FIG. 9, relative to two Comparative Examples (A and B) prepared using a conventional, non-corrugated insert using a 100% tape-wrapped composite core. In each case, the core and most of the aluminum sleeve (insert) slipped out of the steel tube at high load, with no core wire breakage.

Modeling Examples

Figure 8A:
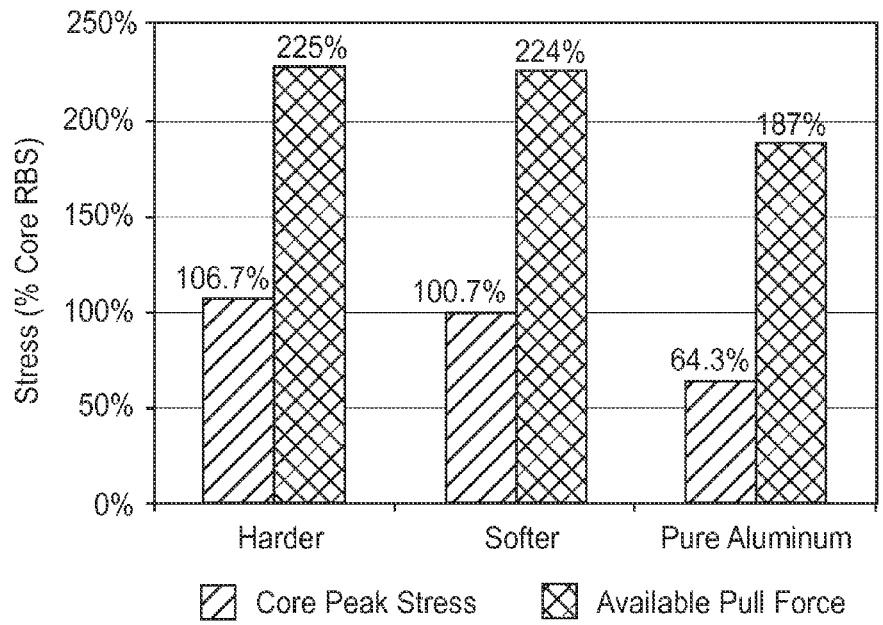
FIG. 8A is a graph showing a histogram plot of stress, expressed as a percentage of rated breaking strength (RBS) of the composite cable core, as a function of metal sleeve hardness for illustrative compression connector assemblies for exemplary composite cables, prepared according to the present disclosure
Figure 8B:
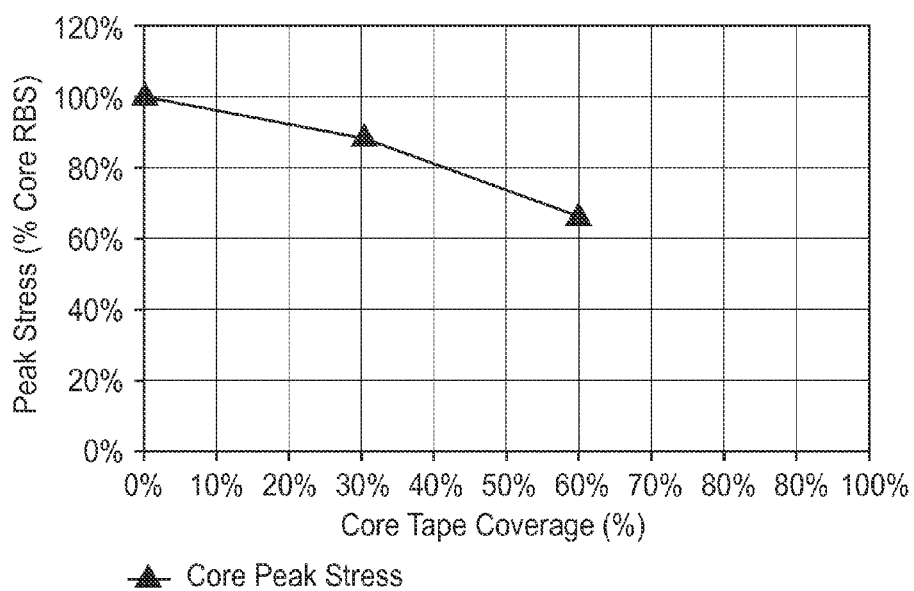
FIG. 8B is a graph showing a plot of peak stress, expressed as a percentage of rated breaking strength (RBS) of the composite cable core, as a function of tape coverage, for illustrative compression connector assemblies for exemplary composite cables, prepared according to the present disclosure.
Figure 8C:
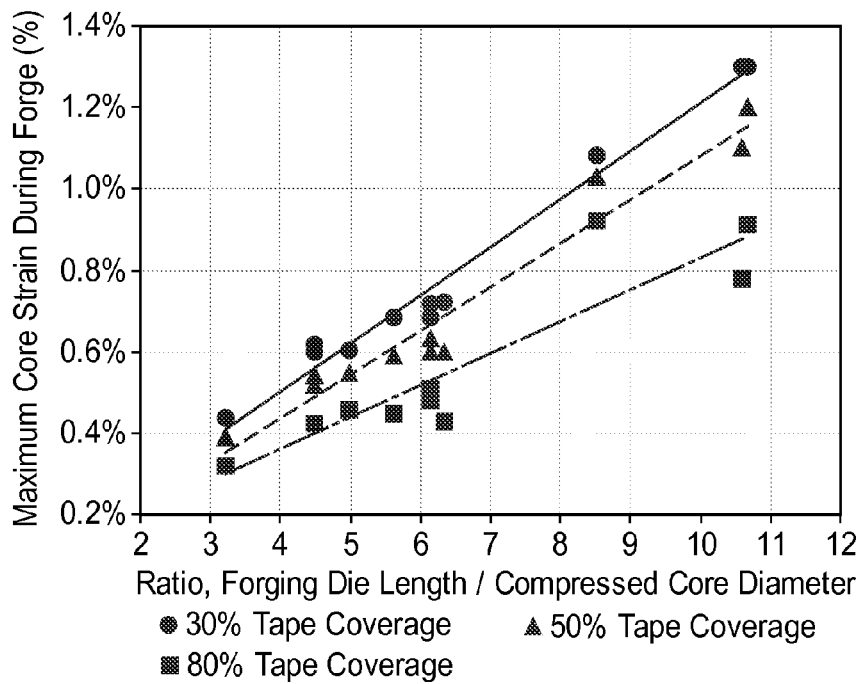
FIG. 8C is a graph showing plot of maximum core strain during forging to form a compression connection as a function of the ratio of forging die length to compressed composite core diameter, with tape coverage as a parameter, for illustrative compression connector assemblies for exemplary composite cables, prepared according to the present disclosure.

A finite element model was constructed to pull the understanding together and construct virtual cases for multiple conductor sizes. The model confirmed the importance of
(1) Insert softness—FIG. 8A
(2) Effect of tape coverage on core breakage—FIG. 8B
(3) Ratio of die bite length/composite core diameter as a function of tape coverage—FIG. 8C FIG. 8A shows that the softest available aluminum would be the best choice for this insert material, producing low peak stress during forging, yet adequate gripping force. FIG. 8B shows that higher tape coverage reduces the stress (and strain) in the composite wire core, and thus would help suppress core fractures during forging. The curves do very nearly intercept the origin, corresponding to zero strain at zero die length, which matches our expectation. It also suggests that core strain is directly proportional to die length: Double the length, double the strain. FIG. 8C shows that the ratio of die length to composite core diameter should be selected to be less than about 6 for more than 50% tape coverage. If 30% tape coverage is desired (for higher gripping strength), then the ratio of die length to composite core diameter should be selected to be less than about 5.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g. 1 to 5 includes 1, 1.5, 2, 2.75, 3, 3.80, 4, and 5). In addition, all numbers used herein are assumed to be modified by the term 'about'.

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A compression connector comprising:
an elongated and interiorly hollow inner tube defining a center longitudinal axis, an interior surface defined by a first radial dimension, an exterior surface defined by a second radial dimension greater than the first radial dimension, and first and second opposed terminal ends, the tube comprising a first material exhibiting a first axial extrusion rate;
at least one tubular sleeve comprising a second material exhibiting a second axial extrusion rate, the at least one tubular sleeve having a length, and an exterior surface defined by a third radial dimension less than the first radial dimension, an interior surface defining an interiorly hollow portion having a fourth radial dimension less than the third radial dimension, and first and second opposed terminal ends, wherein a difference between the third and fourth radial dimensions is selected to define a wall thickness such that the at least one sleeve, when axially inserted through the first or second terminal end of the hollow tube and subjected to mechanical compression in a direction substantially orthogonal to the exterior surface of the tube, deforms so that the first and second materials extrude axially at substantially the same rate.

2. The compression connector of claim 1, wherein the wall thickness of the at least one sleeve is selected to be from about 0.5 mm to about 6 mm.

3. The compression connector of claim 1, wherein the at least one sleeve further comprises a plurality of axially spaced apart corrugations formed in at least one of the exterior surface or the interior surface.

4. The compression connector of claim 1, wherein the first material and the second material comprise at least one metal, and wherein the first material exhibits a yield stress of at least about 206 MPa, and the second material exhibits a yield stress no greater than about 56 MPa.

5. The compression connector of claim 4, wherein the first material comprises carbon steel, and the second material comprises aluminum.

6. The compression connector of claim 1, further comprising an outer and interiorly hollowed tubular body having an interior surface defined by a fifth radial dimension greater than the second radial dimension, and an exterior surface defined by a sixth radial dimension greater than the fifth radial dimension, and first and second opposed terminal ends, the outer tubular body being slidably engaged over the inner tube, optionally wherein the outer tubular body comprises metal.

7. The compression connector of claim 6, further comprising a stranded composite cable having an external radius less than the fifth radial dimension of the outer tubular body, wherein the stranded composite cable comprises a composite core further comprising a single core wire defining a center longitudinal axis, at least a first plurality of composite wires stranded around the single core wire, and at least a second plurality of wires stranded around the first plurality of composite wires, further wherein a terminal portion of the single core wire and the at least first plurality of composite wires extend longitudinally beyond a terminal portion of the at least second plurality of wires, and additionally wherein at least a portion of the terminal portion of the at least first plurality of composite wires has a diameter less than twice the fourth radial dimension of the sleeve, and extends into the interiorly hollow portion of the sleeve.

8. The compression connector of claim 7, wherein the single core wire comprises a metal conductor wire or a composite wire.

9. The compression connector of claim 7, wherein the single core wire comprises at least one optical fiber.

10. The compression connector of claim 7, wherein at least a portion of the first plurality of composite wires is helically stranded around the single wire in at least one cylindrical layer formed about the center longitudinal axis when viewed in a cross section.

11. The compression connector of claim 7, wherein each of the first plurality of composite wires is a fiber reinforced composite wire.

12. The compression connector of claim 11, wherein each of the first plurality of composite wires is selected from the group consisting of a metal matrix composite wire and a polymer composite wire.

13. The compression connector of claim 7, further comprising an insulative sheath forming an outer surface of the composite cable.

14. The compression connector of claim 13, wherein the insulative sheath comprises a material selected from the group consisting of a ceramic, a glass, a (co)polymer, and combinations thereof.

15. The compression connector of claim 14, comprising a dead end cable connector or a cable splice connector.

16. The compression connector of claim 15, wherein the compression connector is a dead end connector, and further wherein the outer tubular body further comprises a terminal application tongue extending from a selected end of the outer tubular body.

17. The compression connector of claim 15, wherein the compression connector is a cable splice connector comprising an outer and interiorly hollowed tubular body having an interior surface defined by a fifth radial dimension greater than the second radial dimension, and an exterior surface defined by a sixth radial dimension greater than the fifth radial dimension, and first and second opposed terminal ends, the outer tubular body being slidably engaged over the tube, and further wherein the at least one sleeve consists essentially of two sleeves.

18. A method of making a compression connector assembly using a compression connector according to claim 7, comprising:
    axially inserting the sleeve into the interiorly hollow portion of the tube;
    inserting the terminal portion of the single core wire and the at least first plurality of composite wires into the interiorly hollow portion of the sleeve;
    after inserting the terminal portion of the single core wire and the at least first plurality of composite wires into the interiorly hollow portion of the sleeve and axially inserting the sleeve into the interiorly hollow portion of the inner tube, mechanically compressing the inner tube in a direction substantially orthogonal to the exterior surface of the tube, thereby deforming the inner tube and the sleeve such that the first and second materials extrude axially at substantially the same rate.

19. The method of claim 18, wherein mechanically compressing the inner tube in a direction substantially orthogonal to the exterior surface of the tube further comprises mechanically compressing the elongated tube in a forging die.

20. The method of claim 19, wherein the forging die has a length and the terminal portion of the single core wire and the at least first plurality of composite wires form a cylindrical composite core having a diameter, and further wherein the ratio of the forging die length to the composite core diameter is no greater than about 6.

* * * * *

UNITED STATES PATENT AND TRADEMARK OFFICE
CERTIFICATE OF CORRECTION

PATENT NO. : 8,895,856 B2  Page 1 of 1
APPLICATION NO. : 13/577920
DATED : November 25, 2014
INVENTOR(S) : Colin Mccullough et al.

It is certified that error appears in the above-identified patent and that said Letters Patent is hereby corrected as shown below:

In the Specification

Column 6, Line 67, Delete "disclosure" and insert -- disclosure. --, therefor.

Column 12, Line 23, Delete "wires" and insert -- wires. --, therefor.

Column 23, Line 34, Delete "and or" and insert -- and/or --, therefor.

Column 23, Line 51, Delete "and or" and insert -- and/or --, therefor.

Column 23, Line 67, Delete "and or" and insert -- and/or --, therefor.

Column 27, Line 43, Delete "and or" and insert -- and/or --, therefor.

Column 34, Line 34, Delete "strength" and insert -- strength. --, therefor.

Column 34, Line 65, Delete "(Hv" and insert -- (HV --, therefor.

Signed and Sealed this
Thirtieth Day of June, 2015

Michelle K. Lee
*Director of the United States Patent and Trademark Office*